United States Patent
Ohno et al.

(10) Patent No.: US 7,862,672 B2
(45) Date of Patent: Jan. 4, 2011

(54) METHOD FOR MANUFACTURING HONEYCOMB STRUCTURE AND EXTRUSION-MOLDING METHOD FOR FORMING COUPLED HONEYCOMB MOLDED BODY

(75) Inventors: Kazushige Ohno, Ibi-gun (JP); Masafumi Kunieda, Ibi-gun (JP); Shigeharu Ishikawa, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 55 days.

(21) Appl. No.: 11/957,122

(22) Filed: Dec. 14, 2007

(65) Prior Publication Data
US 2008/0203626 A1    Aug. 28, 2008

(30) Foreign Application Priority Data
Feb. 28, 2007    (WO) ................ PCT/JP2007/053780

(51) Int. Cl.
*C03B 29/00* (2006.01)
*C04B 33/34* (2006.01)
*B28B 1/00* (2006.01)

(52) U.S. Cl. .................. 156/89.11; 156/89.22; 264/630
(58) Field of Classification Search .............. 156/89.22, 156/89.11; 264/630
See application file for complete search history.

(56) References Cited

U.S. PATENT DOCUMENTS

| | | | |
|---|---|---|---|
| 2,230,309 A | 2/1941 | Reed | |
| 4,353,854 A | 10/1982 | Oyamada et al. | |
| 4,357,987 A | 11/1982 | Oda et al. | |
| 5,388,345 A * | 2/1995 | Brundage et al. | ............. 34/256 |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 2004/0161596 A1 | 8/2004 | Taoka et al. | |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |

(Continued)

FOREIGN PATENT DOCUMENTS

DE    19512351    11/1996

(Continued)

*Primary Examiner*—Mark Osele
*Assistant Examiner*—Nickolas Harm
(74) *Attorney, Agent, or Firm*—Ditthavong Mori & Steiner, P.C.

(57) ABSTRACT

A method is provided that includes extrusion-molding a raw material composition containing ceramic powder and a binder to manufacture a coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion. The method includes firing the coupled honeycomb molded body to manufacture a coupled honeycomb fired body, cutting the coupling portion to manufacture coupling-portion-cut honeycomb fired bodies, and binding a plurality of honeycomb fired bodies by interposing an adhesive layer, where at least one of the bound honeycomb fired bodies is a coupling-portion-cut honeycomb fired body.

20 Claims, 7 Drawing Sheets

U.S. PATENT DOCUMENTS

| | | | |
|---|---|---|---|
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0006769 A1* | 1/2006 | Masters et al. | 310/367 |
| 2006/0021310 A1 | 2/2006 | Ohno et al. | |
| 2006/0051556 A1 | 3/2006 | Ohno et al. | |
| 2006/0166820 A1 | 7/2006 | Ogyu et al. | |
| 2006/0210765 A1 | 9/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0254231 A1 | 11/2006 | Hayashi et al. | |
| 2006/0261117 A1* | 11/2006 | Konrad et al. | 225/2 |
| 2006/0292340 A1* | 12/2006 | Ohno et al. | 428/116 |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0178275 A1 | 8/2007 | Takahashi | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0204580 A1 | 9/2007 | Kunieda | |
| 2007/0212517 A1 | 9/2007 | Ohno et al. | |
| 2007/0293392 A1 | 12/2007 | Ohno et al. | |
| 2008/0202086 A1 | 8/2008 | Ohno et al. | |
| 2008/0202087 A1 | 8/2008 | Ohno et al. | |
| 2008/0203626 A1 | 8/2008 | Ohno et al. | |
| 2008/0236394 A1 | 10/2008 | Ohno et al. | |
| 2008/0237941 A1 | 10/2008 | Ohno et al. | |
| 2008/0241501 A1 | 10/2008 | Ohno et al. | |
| 2008/0286523 A1 | 11/2008 | Ohno et al. | |

FOREIGN PATENT DOCUMENTS

| | | |
|---|---|---|
| EP | 1623750 | 2/2006 |
| EP | 1719881 | 11/2006 |
| JP | 58-039799 B | 11/1979 |
| JP | 55-046338 | 4/1980 |
| JP | 56-129113 | 10/1981 |
| JP | 3-065306 | 3/1991 |
| JP | 2000-279729 | 10/2000 |
| JP | 2004-154718 | 6/2004 |
| JP | 2005-154202 | 6/2005 |
| WO | WO 2005/099865 | 10/2005 |

* cited by examiner

A-A line cross-sectional view

METHOD FOR MANUFACTURING HONEYCOMB STRUCTURE AND EXTRUSION-MOLDING METHOD FOR FORMING COUPLED HONEYCOMB MOLDED BODY

CROSS-REFERENCE TO RELATED APPLICATIONS

The present application claims priority under 35 U.S.C. §119 to PCT Application No. PCT/JP2007/053780, filed Feb. 28, 2007. The contents of this application are incorporated herein by reference in their entirety.

BACKGROUND OF THE INVENTION

1. Field of the Invention

The present invention relates to a method for manufacturing a honeycomb structure.

2. Discussion of the Background

In recent years, particulates such as soot contained in exhaust gases discharged from internal combustion engines of vehicles such as buses and trucks, and construction machines have raised serious problems as contaminants harmful to the environment and the human body. For this reason, various honeycomb filters, which use a honeycomb structure made of porous ceramics, have been proposed as filters that collect particulates in exhaust gases and purify the exhaust gases.

JP2004-154718 A describes a honeycomb filter that is used for purifying exhaust gases and is formed by a honeycomb structure, and a method for manufacturing the honeycomb structure. This honeycomb structure is manufactured by combining a plurality of kinds of honeycomb fired bodies having different shapes by interposing an adhesive layer.

FIG. 1 is a perspective view that schematically shows one example of a conventional round pillar-shaped honeycomb structure. In the honeycomb structure 250, as shown in FIG. 1, three kinds of honeycomb fired bodies 220, 230, and 240 are combined with one another by interposing an adhesive layer 254 to form a ceramic block 255, and a sealing material layer 253 is further formed on a peripheral face 256 of the ceramic block 255.

The honeycomb fired body 220 is a honeycomb fired body whose cross section perpendicular to a longitudinal direction (the direction shown by an arrow C in FIG. 1) has a shape surrounded by two straight lines and one curved line (hereinafter, referred to also as an A-type honeycomb fired body). The honeycomb fired body 230 is a honeycomb fired body whose cross section perpendicular to the longitudinal direction has a shape surrounded by three straight lines and one curved line (hereinafter, referred to also as a B-type honeycomb fired body). The honeycomb fired body 240 is a honeycomb fired body whose cross section perpendicular to the longitudinal direction has a shape surrounded by four straight lines (hereinafter, referred to also as a C-type honeycomb fired body).

FIG. 2A is a perspective view that schematically shows a C-type honeycomb fired body, and FIG. 2B is a cross-sectional view taken along line A-A of FIG. 2A.

Moreover, each of the honeycomb fired bodies 240 has a structure in which a large number of cells 241 are disposed in parallel with one another in the longitudinal direction (the direction shown by an arrow B in FIG. 2A), and a cell wall 242 between the cells 241 is allowed to function as a filter. That is, as shown in FIG. 2B, the ends of either the exhaust gas inlet side or the exhaust gas outlet side of each of the cells 241 formed in the honeycomb fired body 240 is plugged with a plug 246 so that the exhaust gas entering one cell 241 is discharged from another cell 241 after having always passed through a cell wall 242 between the cells 241; thus, when exhaust gas passes through the cell wall 242, particulates are captured by the cell wall 242, so that the exhaust gas is purified.

Here, each of the honeycomb fired bodies 220, 230 and 240 has a structure in which a large number of cells are disposed in the longitudinal direction, with either one of the ends of each of the cells being plugged with a plug, so that each honeycomb fired body is allowed to function as a filter.

Conventionally, each of these honeycomb fired bodies is manufactured through the following processes. First, ceramic powder, a binder, a dispersant solution, and the like are mixed to prepare a mixed composition for manufacturing a molded body, and this mixed composition is loaded into an extrusion-molding machine comprising an extrusion-molding die so that an extrusion-molding process is carried out to manufacture an extrusion-molded body. Next a cutting process for cutting the extrusion-molded body into a predetermined length is carried out.

By using these processes, a honeycomb molded body, having approximately the same shape as the shape of each of the honeycomb fired bodies to be manufactured and having a large number of cells disposed in parallel with one another in a longitudinal direction with a cell wall therebetween, is manufactured.

Subsequently, the resulting honeycomb molded body undergoes a drying process to be dried, and then undergoes a plugging process in which a plug material paste is injected into predetermined cells of the honeycomb molded body that has been dried so that the cells are plugged. The honeycomb molded body to which the plug material paste has been injected is heated to carry out a degreasing process for thermally decomposing organic matters such as the binder in the honeycomb molded body, and a firing process is further carried out on the degreased honeycomb molded body so that a honeycomb fired body is manufactured. The contents of JP2004-154718 A are incorporated herein by reference in their entirety.

SUMMARY OF THE INVENTION

A method for manufacturing a honeycomb structure is provided, an embodiment of which includes extrusion-molding a raw material composition containing ceramic powder and a binder to manufacture a coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion. The method further includes firing the coupled honeycomb molded body to manufacture a coupled honeycomb fired body, cutting the coupling portion of the coupled honeycomb fired body to manufacture a plurality of coupling-portion-cut honeycomb fired bodies, and binding a plurality of honeycomb fired bodies by interposing an adhesive layer, where at least one of the bound plurality of honeycomb fired bodies is a coupling-portion-cut honeycomb fired body.

Another method for manufacturing a honeycomb structure is provided, an embodiment of which includes extrusion-molding a raw material composition containing ceramic powder and a binder to manufacture a coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion. The method also includes cutting the coupling portion of the coupled honeycomb molded body to manufacture a plurality of coupling-portion-cut honeycomb molded bodies, firing the coupling-portion-cut honeycomb molded bodies to manufacture coupling-portion-cut honeycomb fired bodies, and binding a plurality of honeycomb fired bodies by interposing an adhesive layer, where at least one of the bound plurality of honeycomb fired bodies is a coupling-portion-cut honeycomb fired body.

An extrusion-molding method for forming a coupled honeycomb molded body is provided, an embodiment of which includes extrusion-molding a raw material composition containing ceramic powder and a binder through a die installed in an extrusion-molding machine to form the coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion.

A die for extrusion-molding of a raw material composition containing ceramic powder and a binder to form a coupled honeycomb molded body having a plurality of pillar-shaped honeycomb molded bodies and a shape-holding unit adjacent to the plurality of pillar-shaped honeycomb molded bodies, each of the plurality of pillar-shaped honeycomb molded bodies having a number of cells disposed in parallel with one another in a longitudinal direction with a cell wall therebetween and being integrated with one another by interposing a coupling portion, where an embodiment of the die includes a die main body integrally formed of a material supply unit and a molding groove portion, and an outer frame that supports and secures the die main body. The material supply unit includes a material supply hole that is configured to allow a wet mixture of the raw material to pass therethrough. The molding groove portion includes a molding groove configured to form the wet mixture supplied through the material supply hole into a predetermined shape of the cell wall, where the molding groove is defined by a number of square pillar-shaped members and a wall portion. And, the number of square pillar-shaped members are configured to form the cells in the coupled honeycomb molded body, and the wall portion is configured to separate each of the plurality of pillar-shaped honeycomb molded bodies from the shape-holding unit, but leave the coupling portion therebetween, and the number of square pillar-shaped members and the wall portion being arranged in a state where the number of square pillar-shaped members and the wall portion are supported on the material supply unit.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings.

Figure 8A:
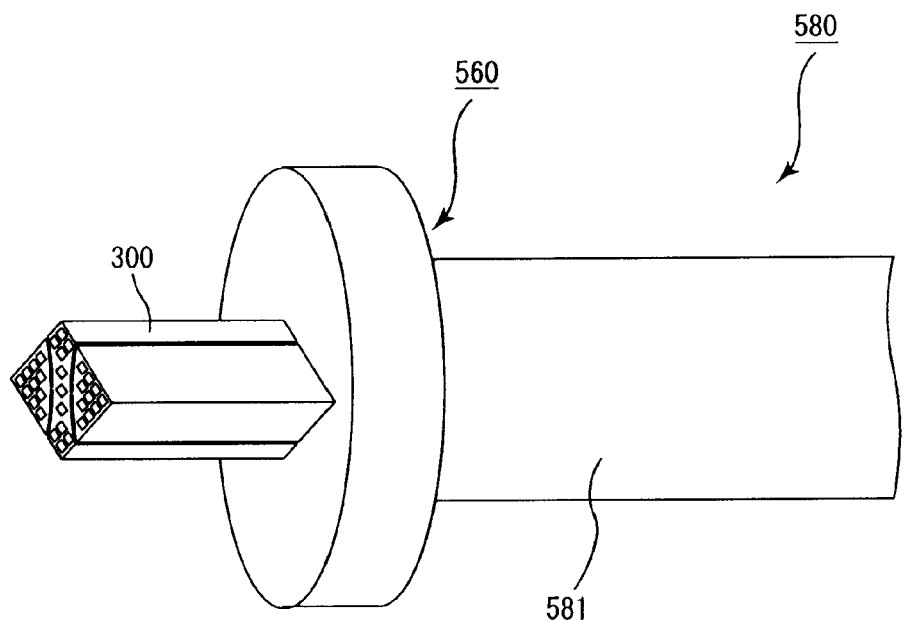
Figure 8B:
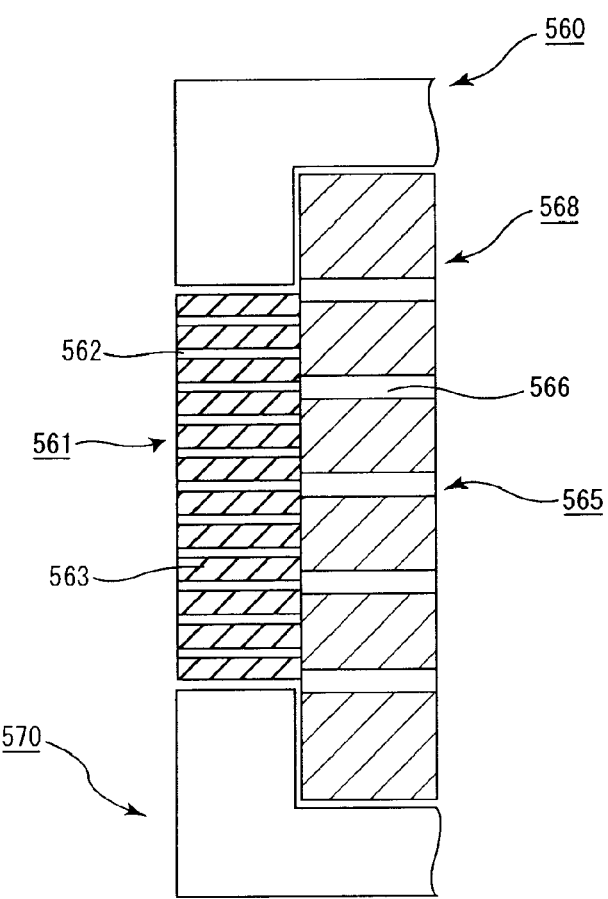

FIG. 8A is a perspective view that schematically shows a state of the vicinity of a die upon manufacturing a coupled honeycomb molded body through an extrusion-molding process in an extrusion-molding machine having the die used for the extrusion-molding process and according to an embodiment of the present invention, and FIG. 8B is a cross-sectional view that schematically shows a cross-sectional shape of the die installed in the extrusion-molding machine of FIG. 8A.

DESCRIPTION OF THE EMBODIMENTS

The embodiments will now be described with reference to the accompanying drawings, wherein like reference numerals designate corresponding or identical elements throughout the various drawings.

A method for manufacturing a honeycomb structure according to an embodiment of the present application preferably includes extrusion-molding a raw material composition containing ceramic powder and a binder to manufacture a coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion. The method further includes firing the coupled honeycomb molded body to manufacture a coupled honeycomb fired body; cutting the coupling portion of the coupled honeycomb fired body to manufacture a plurality of coupling-portion-cut honeycomb fired bodies; and binding a plurality of honeycomb fired bodies by interposing an adhesive layer, at least one of the bound plurality of honeycomb fired bodies being a coupling-portion-cut honeycomb fired body.

A method for manufacturing a honeycomb structure according to another embodiment of the present invention preferably includes extrusion-molding a raw material composition containing ceramic powder and a binder to manufacture a coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion. The method further includes cutting the coupling portion of the coupled honeycomb molded body to manufacture a plurality of coupling-portion-cut honeycomb molded bodies; firing the coupling-portion-cut honeycomb molded bodies to manufacture coupling-portion-cut honeycomb fired bodies; and binding a plurality of honeycomb fired bodies by interposing an adhesive layer, at least one of the bound plurality of honeycomb fired bodies being a coupling-portion-cut honeycomb fired body.

An extrusion-molding method for forming a coupled honeycomb molded body according to another embodiment of the present invention preferably includes extrusion-molding a raw material composition containing ceramic powder and a binder through a die installed in an extrusion-molding machine to form the coupled honeycomb molded body having a shape in which a plurality of pillar-shaped honeycomb molded bodies, each having a number of cells disposed in parallel with one another in a longitudinal direction with a cell wall therebetween, are integrated with one another by interposing a coupling portion.

A die for extrusion-molding of a raw material composition containing ceramic powder and a binder according to an embodiment of the present invention is preferably configured to form a coupled honeycomb molded body having a plurality of pillar-shaped honeycomb molded bodies and a shape-holding unit adjacent to the plurality of pillar-shaped honeycomb molded bodies, each of the plurality of pillar-shaped honeycomb molded bodies having a number of cells disposed in parallel with one another in a longitudinal direction with a cell wall therebetween and being integrated with one another by interposing a coupling portion. The die includes a die main body integrally formed of a material supply unit and a molding groove portion; and an outer frame that supports and secures the die main body, where the material supply unit includes a material supply hole that is configured to allow a wet mixture of the raw material to pass therethrough, and the molding groove portion includes a molding groove configured to form the wet mixture supplied through the material supply hole into a predetermined shape of the cell wall, the molding groove being defined by a number of square pillar-shaped members and a wall portion, and the number of square pillar-shaped members are configured to form the cells in the coupled honeycomb molded body, and the wall portion is configured to separate each of the plurality of pillar-shaped honeycomb molded bodies from the shape-holding unit, but leave the coupling portion therebetween, the number of square pillar-shaped members and the wall portion being arranged in a state where the number of square pillar-shaped members and the wall portion are supported on the material supply unit.

In the case where a honeycomb fired body is manufactured by using processes as described in JP2004-154718 A, a problem arises that it takes a long period of time to manufacture the honeycomb fired body, and there have been strong demands for a method for manufacturing a honeycomb structure that can increase the number of honeycomb fired bodies that can be manufactured per unit time.

In an embodiment according to the first aspect of the present invention, a coupled honeycomb molded body having a shape in which a plurality of honeycomb molded bodies are integrated with one another by interposing a coupling portion is manufactured, and a coupled honeycomb fired body is manufactured by firing the coupled honeycomb molded body, and then, two or more pieces of honeycomb fired bodies are manufactured by cutting coupling portions of the coupled honeycomb fired body, so that it is possible to manufacture, from a single coupled honeycomb molded body, a plurality of honeycomb fired bodies that have been cut at the coupling portions, and have approximately the same length as the length of the coupled honeycomb molded body in the longitudinal direction.

Thus, it is possible to increase the number of honeycomb fired bodies that can be manufactured per unit time.

Here, in the present specification, a molded body having a shape in which a plurality of honeycomb molded bodies are integrated with one another by interposing a coupling portion is referred to as a "coupled honeycomb molded body", and a fired body having a shape in which a plurality of honeycomb fired bodies are integrated with one another by interposing a coupling portion is referred to as "coupled honeycomb fired body."

Moreover, a honeycomb molded body, manufactured through a coupling-portion cutting process for cutting the coupling portions, is referred to as a "coupling-portion-cut honeycomb molded body", and a honeycomb fired body, formed through a coupling-portion cutting process for cutting the coupling portions, is referred to as a "coupling-portion-cut honeycomb fired body".

In the present specification, the word "pillar" in the phrase "pillar shape" refers to any desired shape of a pillar including a round pillar, an oval pillar, a polygonal pillar and the like.

In addition, in the method for manufacturing a honeycomb structure according to the embodiment of the first aspect of the present invention, in the coupling-portion-cutting step, the coupling portion is desirably cut by bending and breaking the coupling portion.

In addition, in the method for manufacturing a honeycomb structure according to the embodiment of the first aspect of the present invention, desirably, the coupled honeycomb fired body has a shape in which two pieces of the pillar-shaped honeycomb fired bodies, each having a side face formed by two planes and a single curved face, are integrated with each other by interposing a coupling portion, the coupling portion being formed on a side face formed by the single curved face and having an approximately rectangular parallelepiped shape with longer sides approximately in parallel with the longitudinal direction.

In addition, the method for manufacturing a honeycomb structure according to the embodiment of the first aspect of the present invention is desirably a method for manufacturing a honeycomb structure, further comprising a coating step of forming a sealing material layer (coat layer) on a periphery of a ceramic block, wherein in the coupling-portion-cutting step, the coupling portion is cut approximately in parallel with the longitudinal direction in such a manner so as to allow a piece of the coupling portion to remain on the side face formed by the curved face of the honeycomb fired body to manufacture a coupling-portion-cut honeycomb fired body having a protruding portion thereon; and in the combining step, the fired bodies are combined with one another so as to allow the side face formed by the curved face of the coupling-portion-cut honeycomb fired body having a protruding portion thereon to be disposed on an outermost periphery to manufacture the ceramic block.

In addition, in the method for manufacturing a honeycomb structure according to the embodiment of the first aspect of the present invention, desirably, the protruding portion has an approximately rectangular parallelepiped shape with longer sides approximately in parallel with the longitudinal direction, and a width and a height of an approximately rectangular shape formed by cutting the protruding portion perpendicularly to the longitudinal direction are both about 0.5 to about 2 mm.

In addition, the method for manufacturing a honeycomb structure according to the embodiment of the first aspect of the present invention is desirably a method for manufacturing a honeycomb structure, further comprising: a plugging step of plugging either one of the ends of each of the cells.

In an embodiment according to the second aspect of the present invention, by manufacturing a coupled honeycomb molded body having a shape in which two or more pieces of honeycomb molded bodies are integrated with one another by interposing a coupling portion, and then, by cutting a coupling portion of the coupled honeycomb molded body, it is possible to manufacture a plurality of coupling-portion-cut honeycomb molded bodies, which have approximately the same length as the length of a single coupled honeycomb molded body in the longitudinal direction.

Thus, the coupling portion-cut honeycomb fired bodies are manufactured by firing the coupling-portion-cut honeycomb molded bodies manufactured through the processes, so that it is possible to increase the number of honeycomb fired bodies to be manufactured per unit time by using a single extrusion-molding machine.

In addition, in the method for manufacturing a honeycomb structure according to the embodiment of the second aspect of the present invention, desirably, the coupled honeycomb molded body has a shape in which two pieces of the pillar-shaped honeycomb molded bodies, each having a side face formed by two planes and a single curved face, are integrated with each other by interposing a coupling portion, the coupling portion being formed on a side face formed by the single curved face and having an approximately rectangular parallelepiped shape with longer sides approximately in parallel with the longitudinal direction.

In addition, the method for manufacturing a honeycomb structure according to the embodiment of the second aspect of the present invention is desirably a method for manufacturing a honeycomb structure, further comprising: a coating step of forming a sealing material layer (coat layer) on a periphery of a ceramic block, wherein in the coupling-portion-cutting step, the coupling portion is cut approximately in parallel with the longitudinal direction in such a manner so as to allow a piece of the coupling portion to remain on the side face formed by the curved face of the honeycomb molded body to manufacture a coupling-portion-cut honeycomb molded body having a protruding portion thereon; and in the combining step, the fired bodies are combined with one another so as to allow the side face formed by the curved face of the coupling-portion-cut honeycomb fired body having a protruding portion formed to be disposed on an outermost periphery to manufacture the ceramic block.

In addition, in the method for manufacturing a honeycomb structure according to the embodiment of the second aspect of the present invention, desirably, the protruding portion has an approximately rectangular parallelepiped shape with longer sides approximately in parallel with the longitudinal direction, and a width and a height of an approximately rectangular shape formed by cutting the protruding portion perpendicularly to the longitudinal direction are both about 0.5 to about 2 mm.

In addition, the method for manufacturing a honeycomb structure according to the embodiment of the second aspect of the present invention is desirably a method for manufacturing a honeycomb structure, further comprising: a plugging step of plugging either one of the ends of each of the cells.

In the method for manufacturing a honeycomb structure according to the embodiment of the first aspect of the present invention, required numbers of each of three kinds of honeycomb fired bodies, that is, A-type honeycomb fired bodies, B-type honeycomb fired bodies and C-type honeycomb fired bodies, are manufactured, and a honeycomb structure is manufactured by combining these honeycomb fired bodies.

Figure 3:
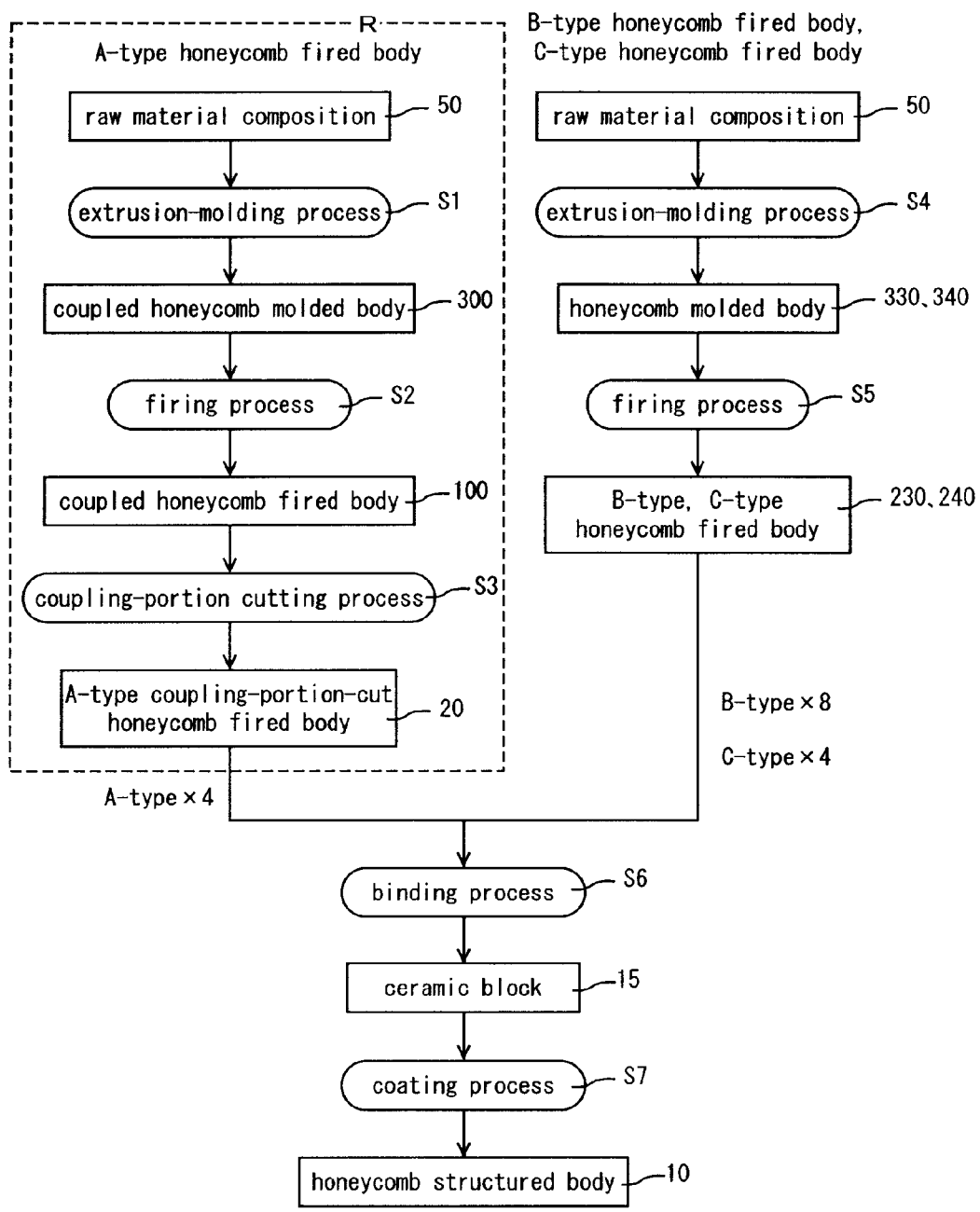
FIG. 3 is a flow chart that describes main processes among the respective processes of a method for manufacturing a honeycomb structure according to an embodiment of the present invention.

FIG. 3 is a flow chart used for describing main processes among the respective processes of the method for manufacturing a honeycomb structure according to the embodiment of the first aspect of the present invention.

The processes that feature of the embodiment of the present invention are processes for manufacturing an A-type coupling-portion-cut honeycomb fired body 20 by carrying out an extrusion-molding step S1, a firing step S2 and a coupling-portion cutting step S3, as shown in an upper left part (area surrounded by a dotted line R).

In the extrusion-molding step S1, a raw material composition containing silicon carbide powder is extrusion-molded through a die by using an extrusion-molding machine so that a coupled honeycomb molded body is manufactured.

Figure 4:
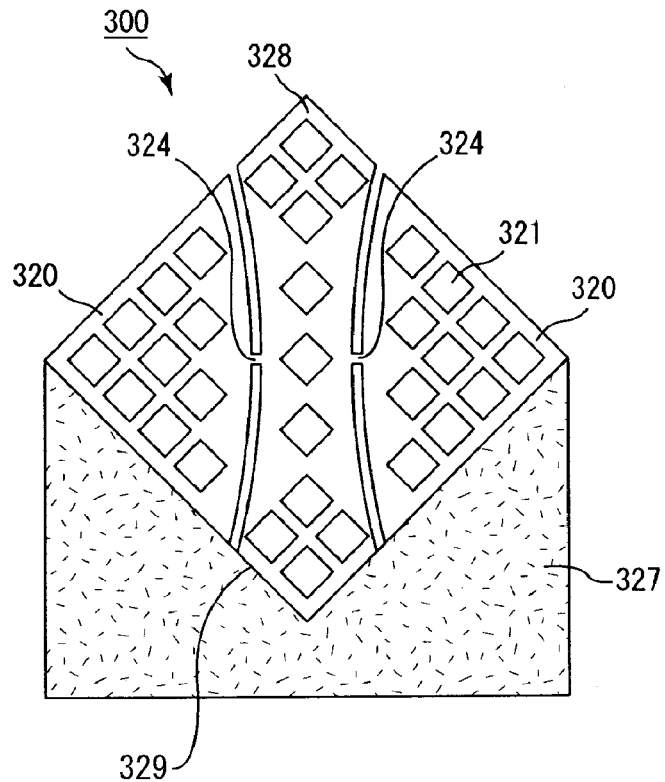
FIG. 4 is a side view that schematically shows one example of a coupled honeycomb molded body extrusion-molded in an extrusion-molding process according to an embodiment of the present invention.

FIG. 4 is a side view that schematically shows one example of a coupled honeycomb molded body according to the embodiment of the present invention.

A coupled honeycomb molded body 300, which is placed on a mounting base 327 having a V-shape in its cross-sectional shape, has a structure in which each of two pieces of honeycomb molded bodies 320 disposed bilaterally is connected to one of the ends of coupling portions 324, with the other end of the coupling portions 324 being connected to a shape-holding portion 328.

Therefore, the honeycomb molded bodies 320 disposed bilaterally are integrated with one another by interposing coupling portions 324 and a shape-holding portion 328.

The honeycomb molded body 320 has a large number of cells 321 disposed in parallel with one another in a direction (longitudinal direction) in which the coupled honeycomb molded body 300 is extrusion-molded. Here, each of the honeycomb molded bodies 320 has a shape surrounded by two straight lines and one curved line connected to the coupling portion 324, in its cross-sectional shape cut by a cross section perpendicular to the longitudinal direction.

Next, the coupled honeycomb molded body 300 undergoes a molded-body cutting process to be cut into a predetermined length, and this further undergoes a drying process. Moreover, this undergoes a plugging process in which one of the ends of each cell 321 is plugged, and then undergoes a degreasing process under predetermined conditions.

With respect to the conditions of the molded-body cutting process, drying process and degreasing process, those conditions conventionally used upon manufacturing a honeycomb fired body may be employed.

Subsequently, the firing step S2 is carried out. In the firing step S2, the coupled honeycomb molded body is fired in a firing furnace so that a coupled honeycomb fired body is manufactured.

The cross-sectional shape perpendicular to the longitudinal direction of the coupled honeycomb fired body is approximately the same as the cross-sectional shape perpendicular to the longitudinal direction of the coupled honeycomb molded body 300, and has a shape in which two pieces of the A-type honeycomb fired bodies are integrated with each other.

Here, with respect to the condition of the firing process, the condition conventionally used upon manufacturing a honeycomb fired body may be employed.

Subsequently, the coupling-portion cutting step S3 is carried out. In the coupling-portion cutting step S3, the two coupling portions manufactured on the coupled honeycomb fired body are bent and broken so that two pieces of A-type honeycomb fired bodies are manufactured.

Figure 5:
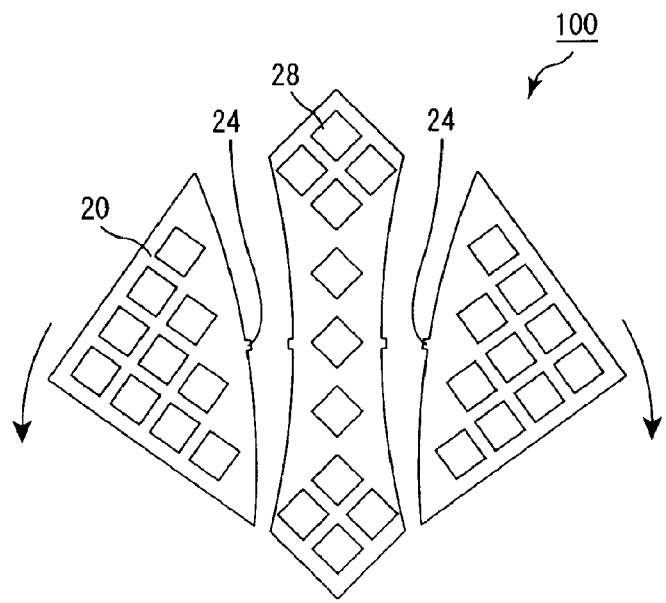
FIG. 5 is a side view that schematically shows a method for manufacturing a coupling-portion-cut honeycomb fired body by bending and breaking a coupling portion of a coupled honeycomb fired body according to the embodiment of the present invention.

FIG. 5 is a side view that schematically shows a method for manufacturing coupling-portion-cut honeycomb fired bodies by bending and breaking a coupling portion of a coupled honeycomb fired body according to the embodiment of the present invention.

In the coupling-portion cutting step, a downward force is applied to the bilateral honeycomb fired bodies, with the shape-holding portion 28 being secured, so that the coupling portion of the coupled honeycomb fired body 100 is bent and broken.

By using this step, two pieces of A-type coupling-portion-cut honeycomb fired bodies 20 (see FIG. 6A), formed by cutting the coupling portions, are simultaneously manufactured.

Thus, a piece of the coupling portion bent and broken is allowed to remain on the side face formed by the curved face as a protruding portion 24 in the A-type coupling-portion-cut honeycomb fired body 20 manufactured by the step.

According to the steps, treatments of the extrusion-molding process and the respective processes after the molded-body cutting process can be carried out on each of the coupled honeycomb molded bodies that includes two pieces of honeycomb fired bodies. Thus, two pieces of A-type coupling-portion-cut honeycomb fired bodies can be manufactured from one coupled honeycomb molded body having a predetermined length.

Therefore, in comparison with the case where a honeycomb molded body having approximately the same shape as the shape of the A-type honeycomb fired body is manufactured and the A-type honeycomb fired body is then manufactured by firing the honeycomb molded body, the number of coupled honeycomb molded bodies needed for manufacturing the same number of the A-type honeycomb fired bodies can be reduced to half.

Moreover, it is also possible to reduce to half the number of the coupled honeycomb molded bodies to undergo treatments, needed for carrying out the respective processes after the molded-body cutting process.

Therefore, it is possible to approximately double the number of A-type honeycomb fired bodies that can be manufactured per unit time.

Moreover, the die provided in the extrusion-molding machine to be used in the extrusion-molding process, which is a member made of metal such as tool steel, tends to be worn out when the extrusion-molding process for the raw material composition containing silicon carbide powder is carried out repeatedly, likely failing to manufacture a molded body having a predetermined thickness.

For this reason, in the conventional extrusion-molding process, it is necessary to exchange dies after a predetermined amount of the raw material composition has been extrusion-molded, resulting in problems of cost and time-consuming tasks needed for exchanging the dies.

However, in the case where the A-type honeycomb fired body is manufactured by using the method for manufacturing a honeycomb structure according to the embodiment of the present invention, two pieces of A-type honeycomb fired bodies can be manufactured from a single coupled honeycomb molded body having a predetermined length; therefore, in comparison with the case where a honeycomb molded body having approximately the same shape as the shape of the A-type honeycomb fired body is manufactured and the resulting honeycomb molded body is fired to manufacture an A-type honeycomb fired body, it is possible to increase the number of the A-type honeycomb fired bodies that can be manufactured by the time when a single die has been worn out.

Thus, the frequency of exchanging dies is reduced, and it becomes easy to reduce the cost and time-consuming tasks needed for exchanging the dies. Consequently, it becomes easy to reduce costs needed for manufacturing a honeycomb structure.

In the method for manufacturing a honeycomb structure according to the embodiment of the present invention, a combining step S6 is carried out in which the coupling-portion-cut honeycomb fired bodies 20, thus manufactured, are combined with B-type honeycomb fired bodies 230 and C-type honeycomb fired bodies 240 that have been manufactured separately to combine these in a manner as shown in a lower portion of a chart of FIG. 3, so that a ceramic block 15 is manufactured, and then a coating step S7 is carried out in which forming a sealing material layer (coat layer) is formed on the periphery of the ceramic block 15, so that a honeycomb structure 10 is manufactured.

Here, as shown in an upper right part of the flow chart of FIG. 3, the B-type honeycomb fired body 230 and the C-type honeycomb fired body 240 can be manufactured by forming honeycomb molded bodies 330 and 340 through the extrusion-molding step S4 used for extrusion-molding the raw material composition 50 and by carrying out a firing step S5 on the resulting honeycomb molded bodies 330 and 340.

The following description will discuss one example of a honeycomb structure that can be manufactured by the method for manufacturing a honeycomb structure according to the embodiment of the present invention.

Figure 6A:
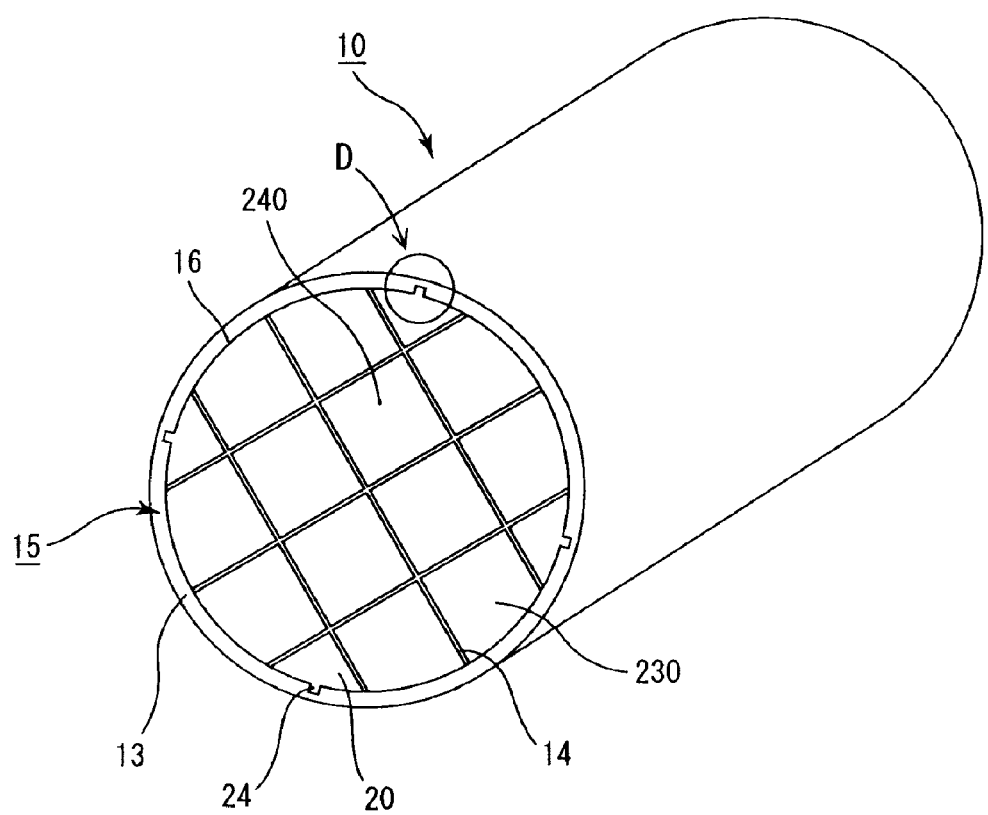
FIG. 6A is a perspective view that schematically shows one example of a honeycomb structure that can be manufactured by using a method for manufacturing a honeycomb structure according to the embodiment of the present invention.
Figure 6B:
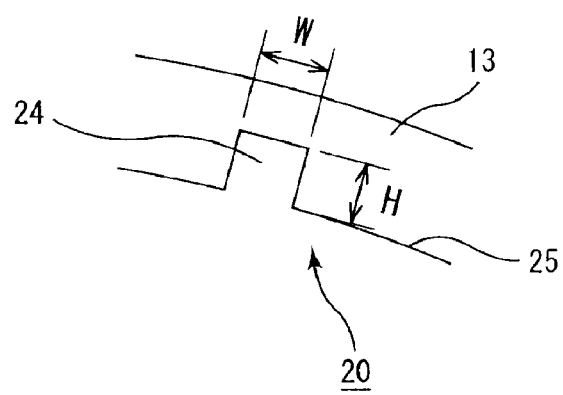
FIG. 6B is an enlarged view that shows a protruding portion indicated by D in FIG. 6A.

FIG. 6A is a perspective view that schematically shows one example of a honeycomb structure that can be manufactured by using a method for manufacturing a honeycomb structure according to the embodiment of the present invention, and FIG. 6B is an enlarged view that shows a protruding portion indicated by D in FIG. 6A.

A honeycomb structure 10 shown in FIG. 6A is formed through the following processes: A-type coupling-portion-cut honeycomb fired bodies 20, B-type honeycomb fired bodies 230 and C-type honeycomb fired bodies 240 are combined with one another by interposing an adhesive layer 14 so that a ceramic block 15 is formed, and a sealing material layer 13 is formed on the peripheral face 16 of the ceramic block 15.

Here, a protruding portion 24 is formed on a side face formed by a curved face of each of the A-type coupling-portion-cut honeycomb fired bodies 20 (see FIG. 6B).

This protruding portion 24 is a portion that is formed by allowing a coupling portion to remain on a side face formed by a curved face, after the coupling portion of the coupled honeycomb fired body has been cut. Moreover, the protruding portion 24 is continuously formed on the A-type coupling-portion-cut honeycomb fired body 20 in a direction parallel to the longitudinal direction thereof in such a manner so as to protrude from the curved face.

In each of the honeycomb fired bodies 20, 230, and 240, a large number of cells are longitudinally disposed in parallel with one another with a cell wall 22 therebetween, and either one of the ends of each of the cells is plugged with a plug, so that the cell wall is allowed to function as a filter. Therefore, exhaust gas that has entered one cell 21 is discharged from another cell 21 after having always passed through a cell wall 22 between the cells 21.

Next, the following description will discuss a preferable embodiment of the method for manufacturing a honeycomb structure according to the embodiment of the first aspect of the present invention.

In the method for manufacturing a honeycomb structure according to the embodiment of the first aspect of the present invention, the coupled honeycomb fired body desirably has a shape in which two pieces of the pillar-shaped honeycomb fired bodies, each having a side face formed by two planes and a single curved face, are integrated with each other by interposing a coupling portion, the coupling portion being formed on a side face forming the single curved face and having an approximately rectangular parallelepiped shape with longer sides approximately in parallel with the longitudinal direction.

In the case where the coupled honeycomb fired body is formed into such a shape, it is possible to manufacture two pieces of A-type honeycomb fired bodies by forming a single coupled honeycomb molded body having a predetermined length.

In addition, the method for manufacturing a honeycomb structure according to the embodiment of the first aspect of the present invention is desirably a method for manufacturing a honeycomb structure, further comprising a coating step of forming a sealing material layer (coat layer) on a periphery of a ceramic block, wherein in the coupling-portion-cutting step, the coupling portion is cut approximately in parallel with the longitudinal direction in such a manner so as to allow a piece of the coupling portion to remain on the side face formed by the curved face of the honeycomb fired body to manufacture a coupling-portion-cut honeycomb fired body having a protruding portion thereon; and in the combining step, the fired bodies are combined with one another so as to allow the side face formed by the curved face of the coupling-portion-cut honeycomb fired body having a protruding portion thereon to be disposed on an outermost periphery to manufacture the ceramic block.

By carrying out the coating process, it is possible to manufacture a honeycomb structure with a sealing material layer being formed on the outermost periphery thereof.

The honeycomb structure having the sealing material layer formed thereon makes it possible to provide a honeycomb structure that is free from gas leakage from the peripheral portion of the honeycomb structure even when gases are allowed to flow through the cells upon using the honeycomb structure as an exhaust-gas-purifying filter.

Here, the sealing material layer needs to be formed so as not to be separated from the ceramic block, even when the honeycomb structure is repeatedly used as an exhaust-gas-purifying filter.

In the honeycomb structure manufactured by the method for manufacturing a honeycomb structure according to the embodiment of the present invention, since the protruding portion, formed as a piece of the coupling portion remaining thereon, is formed on the side face formed by the curved face of the coupled honeycomb fired body, an anchoring effect is exerted because of adhesion between the sealing material layer and the ceramic block. For this reason, in comparison with a honeycomb structure with no protruding portion being formed on any side face of the honeycomb fired body, the resulting honeycomb structure has a structure in which the sealing material layer is less likely to be separated from the ceramic block.

Moreover, since the surface of the cut protruding portion is not smooth, a more improved adhesive force is exerted onto the sealing material layer.

Moreover, in the method for manufacturing a honeycomb structure according to the embodiment of the first aspect of the present invention, upon carrying out the coating process for forming the sealing material layer (coat layer), the shape of the protruding portion is not particularly limited, and the protruding portion has an approximately rectangular parallelepiped shape with longer sides approximately in parallel with the longitudinal direction, and both of a width and a height of an approximately rectangular shape formed by cutting the protruding portion perpendicularly to the longitudinal direction are desirably about 0.5 to about 2 mm.

Here, the width of the protruding portion is defined as a dimension W in FIG. 6B that corresponds to the width of the upper face of the protruding portion 24, and the height of the protruding portion is defined as a dimension H in FIG. 6B that corresponds to the height from the upper face of the protruding portion 24 to the curved face 25 of the honeycomb fired body 20.

In the case where the heights from the upper face of the protruding portion 24 to the curved face of the A-type coupling-portion-cut honeycomb fired body 20 are different between the two sides of the upper face, the dimension of the longer side is defined as the height of the protruding portion.

When the width or the height of the approximately rectangular shape is less than about 0.5 mm, it is difficult to manufacture a honeycomb structure with the sealing material layer less likely to be separated from the ceramic block.

In contrast, in the case where the width is more than about 2 mm, the cutting of the coupling portion tends to be difficult.

Moreover, in the case where the height exceeds about 2 mm, the protruding portion sticks out of the surface of the sealing material layer, sometimes disturbing the installation of the honeycomb structure into an exhaust gas purifying device, with the result that the thickness of the sealing material layer needs to be increased so as to prevent the protruding portion from sticking out.

Moreover, a thickness of the sealing material layer to be formed in the coating process is desirably about 0.5 to about 2.5 mm, and desirably made thicker than the thickness of the protruding portion. This structure is made because the protruding portion sticking out of the surface of the sealing material layer tends to interfere with the installing process of the honeycomb structure into an exhaust-gas-purifying apparatus.

The following description will discuss another embodiment of the method for manufacturing a honeycomb structure according to the first aspect of the present invention.

In the present embodiment, a coupled honeycomb molded body having a shape in which one honeycomb molded body is connected through two coupling portions is manufactured.

Figure 7:
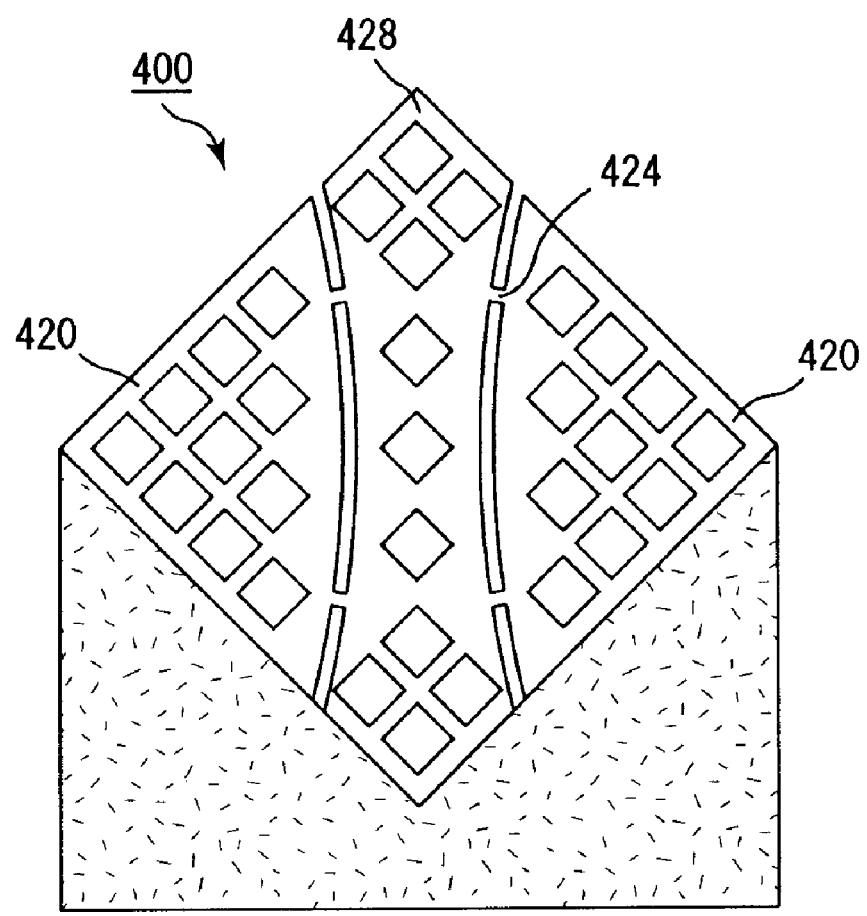
FIG. 7 is a side view that schematically shows another example of a coupled honeycomb molded body extrusion-molded in an extrusion-molding process according to the embodiment of the present invention.

FIG. 7 is a side view that schematically shows another example of a coupled honeycomb molded body extrusion-molded in an extrusion-molding process.

A coupled honeycomb molded body 400 shown in FIG. 7 has approximately the same shape as the shape of the coupled honeycomb molded body 300 shown in FIG. 4, except that the coupled honeycomb molded body 400 has a shape in which one honeycomb molded body 420 is connected to a shape maintaining portion 428 through two coupling portions 424.

In the present embodiment, the coupled honeycomb molded body 400 is molded by an extrusion-molding process, and after having been cut into a predetermined length, the coupled honeycomb molded body 400 further undergoes a drying process, a plugging process, a degreasing process and a firing process so that a coupled honeycomb fired body is manufactured, and each of the four coupling portions formed in the coupled honeycomb fired body are cut so that two pieces of A-type coupling-portion-cut honeycomb fired bodies, each having two protruding portions formed thereon, can be manufactured.

The A-type coupling-portion-cut honeycomb fired body can also be used for manufacturing a honeycomb fired body in the same manner as in the A-type coupling-portion-cut honeycomb fired body 20 with one protruding portion formed thereon, which has been described earlier.

In another embodiment of the method for manufacturing a honeycomb structure according to the first aspect of the present invention, a coupling-portion-cut honeycomb fired body with no protruding portion formed thereon may be manufactured.

Examples of the method for manufacturing the coupling-portion-cut honeycomb fired body with no protruding portion formed thereon include a method in which, after the coupling portion of a coupled honeycomb fired body has been bent and broken, the remaining coupling portion on the coupling-portion-cut honeycomb fired body is scraped off by using a diamond cutter, a file, or the like, a method in which upon cutting off the coupling portion of a coupled honeycomb fired body, the coupling portion is cut off along the side face of the coupling-portion-cut honeycomb fired body to be manufactured, by using a jig-saw or the like, and the like.

By using the method, it is possible to manufacture an A-type coupling-portion-cut honeycomb fired body without a protruding portion formed thereon.

Figure 1:
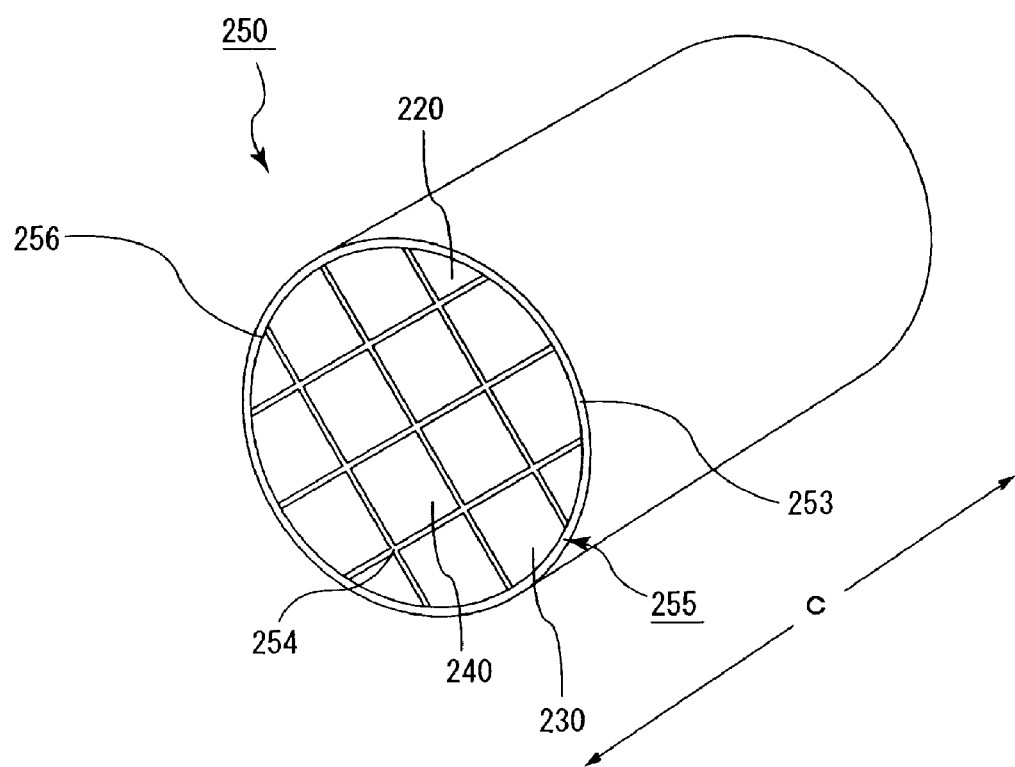
FIG. 1 is a perspective view that schematically shows a conventional round pillar-shaped honeycomb structure.
Figure 2A:
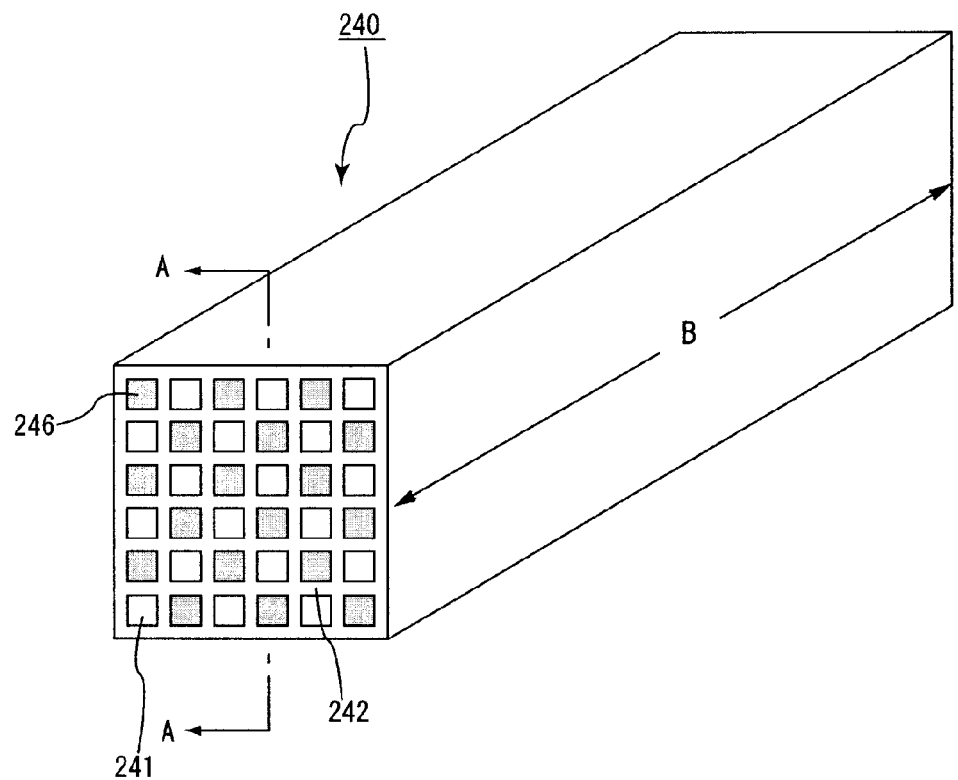
FIG. 2A is a perspective view that schematically shows a C-type honeycomb fired body.
Figure 2B:
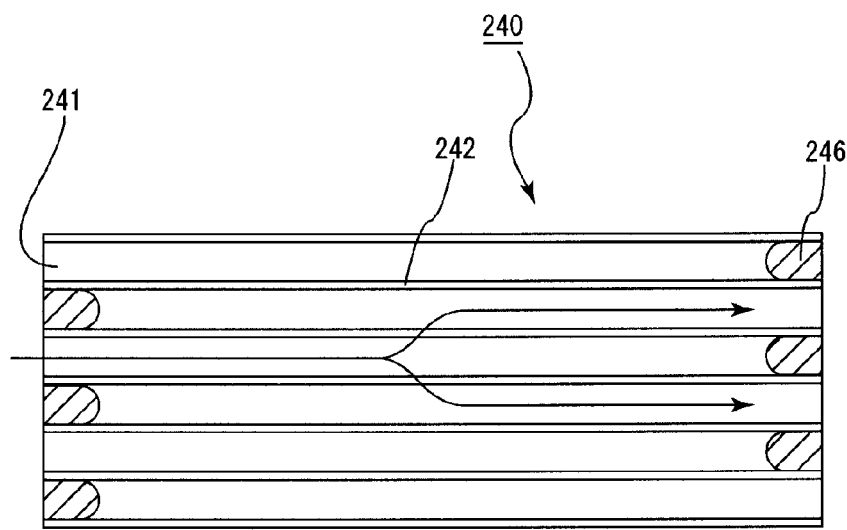
FIG. 2B is a cross-sectional view taken along line A-A of FIG. 2A.

Therefore, by using such A-type coupling-portion-cut honeycomb fired bodies, it is possible to manufacture a round pillar-shaped honeycomb structure 250 without a protruding portion formed thereon as shown in FIG. 1.

Subsequently, the embodiments of the method for manufacturing a honeycomb structure according to the first aspect of the present invention will be described in further detail.

Ceramic powder in the raw material composition used in the method for manufacturing a honeycomb structure according to the embodiment of the first aspect of the present invention is not particularly limited, and examples thereof include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and aluminum titanate; and the like.

Non-oxide ceramics are desirably used among these, and in particularly, silicon carbide is more desirably used. This material is superior in the heat-resistant property, mechanical strength, thermal conductivity, and the like. Here, a silicon-containing ceramic material prepared by blending metal silicon into the ceramic material and a ceramic material in which ceramic is bonded by silicon or a silicate compound may also be used, and a material prepared by blending metal silicon into silicon carbide (silicon-containing silicon carbide) is desirably used among these.

In particular, a silicon-containing silicon-carbide-based ceramic material containing about 60% by weight or more of silicon carbide is desirably used.

The particle size of the ceramic powder is not particularly limited, the ceramic powder that tends not to cause the case where the size of the honeycomb structure manufactured by the following firing process becomes smaller than that of the honeycomb molded body after degreased is desirable, and for example, mixed powder prepared by combining 100 parts by weight of ceramic particles having an average particle size of about 1.0 to about 50 μm with about 5 to about 65 parts by weight of ceramic particles having an average particle size of about 0.1 to about 1.0 μm, is desirably used. By mixing the ceramic particles having the particle sizes at the blending ratio, it becomes possible to manufacture a honeycomb fired body having a porous property.

The binder in the raw material composition is not particularly limited, and examples thereof include methyl cellulose, carboxymethyl cellulose, hydroxymethyl cellulose, polyethylene glycol, and the like.

Normally, the blending ratio of the binder is desirably about 1 to about 10 parts by weight with respect to 100 parts by weight of ceramic powder.

A dispersant solution may be added to the raw material composition as a moisture content. The dispersant solution is not particularly limited, and examples thereof include alcohol such as methanol, an organic solvent such as benzene, water, and the like.

An appropriate amount of the dispersant solution is blended so as to set the viscosity of the wet mixture in a predetermined range.

Moreover, a molding auxiliary may be added to the raw material composition, if necessary.

The molding auxiliary are not particularly limited, and examples thereof include ethylene glycol, dextrin, fatty acid soap, fatty acid, polyalcohol, and the like.

Furthermore, a pore-forming agent, such as balloons that are fine hollow spheres composed of oxide-based ceramics, spherical acrylic particles and graphite, may be added to the wet mixture, if necessary.

The balloons are not particularly limited, and examples thereof include alumina balloons, glass micro-balloons, shirasu balloons, fly ash balloons (FA balloons), mullite balloons, and the like may be used. Fly ash balloons are more desirably used among these.

After these ceramic powder, binder and dispersant solution have been mixed by using an attritor or the like, the resulting mixture is sufficiently kneaded by using a kneader or the like, and then extrusion-molded so that a coupled honeycomb molded body is manufactured.

The extrusion-molding machine comprising a die to be used in the present extrusion-molding process is not particularly limited, and with reference to the drawings, the following description will discuss the extrusion-molding machine and the die installed in the extrusion-molding machine.

In addition, the extrusion-molding process to be carried out by using the extrusion-molding machine is also described.

FIG. 8A is a perspective view that schematically shows a state of the vicinity of the die upon manufacturing a coupled honeycomb molded body through the extrusion-molding process in the extrusion-molding machine having the die used for the extrusion-molding process and according to the embodiment of the present invention.

FIG. 8B is a cross-sectional view that schematically shows a cross-sectional shape of the die installed in the extrusion-molding machine shown in FIG. 8A.

In the extrusion-molding machine 580 shown in FIG. 8A, an extrusion-molding die 560 is attached to the tip of a casing 581, and a screw (not shown) is installed inside the casing 581.

Therefore, a wet mixture is charged into the extrusion-molding machine from a material charging section, not shown, and the wet composition is mixed and pushed into the die 560 by the screw; thereby, a coupled honeycomb molded body 300 can be continuously manufactured.

The die 560, installed in the extrusion-molding machine and shown in FIG. 8B, is configured by a die main body 568 in which a material supply unit 565 and a molding groove portion 561 are integrally formed, and an outer frame 570 that supports and secures the die main body 568.

A material supply hole 566 for allowing the wet mixture to pass therethrough is formed in the material supply unit 565, and a molding groove 562 used for molding the wet mixture that has passed through the material supply hole 566 into a predetermined shape is formed in the molding groove portion 561.

That is, in the molding groove portion 561, a large number of pillar-shaped members 563 having a square pillar shape, which is used for forming cells in a coupled honeycomb molded body 300 to be extrusion-molded, and a wall portion (not shown) forming a portion used for separating a honeycomb molded body 320 and a shape-holding unit 328 from each other and for forming a coupling portion 324 are arranged in a state where they are supported on a member forming the material supply unit 565.

In the present extrusion-molding process, by allowing the wet mixture to continuously pass through the molding groove 562 formed by the pillar-shaped members 563 and the wall portion, a molded body having a shape in which two or more pieces of honeycomb molded bodies are integrated with one another by interposing the coupling portion can be manufactured.

Here, the material for the die 560 is not particularly limited, and those dies that are less susceptible to wear even when ceramic powder having high hardness is extrusion-molded. Examples thereof include a tool steel, a tool steel for hot-working, a hard metal, and the like.

Moreover, as shown in FIG. 4, each coupled honeycomb molded body 300 that has been extrusion-molded through the present extrusion-molding process is desirably placed on a mounting surface 329 of a mounting base 327 having a V-shape in its cross-sectional shape, with the side faces of the molded bodies being in contact with the V-shape, in such a position that the coupling portion in the molded body and the adjacent honeycomb molded body are bilaterally aligned.

By placing the coupled honeycomb molded bodies 300 on the mounting base in this manner, it becomes easy to prevent the shape of each coupled honeycomb molded body 300 that has been extrusion-molded from collapsing.

Next, a molded body cutting process is carried out so that the coupled honeycomb molded body 300, thus extrusion-molded, is cut into a predetermined length. The method for cutting the molded body into a predetermined length is not particularly limited, and a cutter with a blade, a laser, a linear shape member, and the like, for example, may be used for carrying out the cutting method.

The method using the linear shape member for cutting is desirably employed among these methods. In the case where the linear shape member is used, since the contact area to the molded body is limited to an extremely small area, it is possible to prevent the cut portion from causing deformation, such as shear deformation, and cracks, and since, different from a laser, no additional equipment or the like is needed, it is possible to reduce the running cost to a low level.

Next, the coupled honeycomb molded body cut into the predetermined length undergoes a drying process.

In the drying process, a drying apparatus, such as a microwave drying apparatus, a hot-air drying apparatus, a dielectric drying apparatus, a reduced-pressure drying apparatus, a vacuum drying apparatus and a freeze drying apparatus, may be used.

Here, the drying process is not necessarily needed, and can be carried out on demand.

Thereafter, a plug material paste that forms plugs is injected into predetermined cells so that a plugging process for sealing the cells is carried out.

The plug material paste is not particularly limited, and those pastes that allow the plugs after manufactured to have a porosity of about 35 to about 60% are desirably used. For example, the paste that is the same as the raw material composition may be used as the plug material paste, and to the ceramic powder used as the raw material composition are desirably added a lubricant, a solvent, a dispersant and a binder.

Here, the plugging process is not necessarily needed, and may be carried out on demand. In the case where no plugging process is carried out, a honeycomb structure to be manufactured can be preferably used as a catalyst supporting carrier.

Next, the honeycomb molded body having a predetermined length, which has undergone the drying treatment and the plugging treatment, undergoes a degreasing process and a firing process under predetermined conditions. Thus, it is possible to manufacture a coupled honeycomb fired body having a plurality of cells disposed in parallel with one another in a longitudinal direction with a cell wall therebetween.

Next, each of the coupling portions attached to the coupled honeycomb fired body are cut so that two or more pieces of coupling portion-cut honeycomb fired bodies are manufactured.

The method for cutting the coupling portion is not particularly limited. In addition to the method in which the coupling portion is bent and broken, cutting methods that use a diamond cutter, a jig-saw, a file, a cutter provided with a cutting blade, a laser, a linear shape member, or the like, may also be used.

In this case, it is preferable to carry out the cutting process so as to allow a protruding portion to remain at the cut portion.

The method in which the coupling portion is bent and broken is desirably used among these methods.

In the case where the method in which the coupling portion is bent and broken is used, the cutting process hardly takes time, and no special equipment is needed.

A coupling portion-cut honeycomb fired body can be manufactured through the processes.

As has been described above, in the method for manufacturing a honeycomb structure according to the embodiment of the first aspect of the present invention, at least one of the honeycomb fired bodies to be combined in a combining process of honeycomb fired bodies is manufactured by carrying out the following processes: extrusion-molding for manufacturing a coupled honeycomb molded body having a shape in which a plurality of honeycomb molded bodies are combined with one another by interposing a coupling portion by extrusion-molding a raw material composition; firing the coupled honeycomb molded body to manufacture a coupled honeycomb fired body; and cutting the coupling portion.

With respect to the other honeycomb fired bodies, extrusion-molding is carried out in the same manner as in the conventionally-used method for manufacturing a honeycomb fired body so that honeycomb molded bodies having approximately the same shapes as the shapes of honeycomb fired bodies to be formed are manufactured, and by carrying out drying, plugging, degreasing and firing on the honeycomb molded bodies, the other honeycomb fired bodies can be manufactured.

Next, the honeycomb fired bodies thus manufactured by the processes undergoes a combining process.

First, the honeycomb fired bodies thus manufactured are combined with one another to form a honeycomb aggregated body having a predetermined size. The honeycomb aggregated body is formed by using, for example, the following methods: a method in which an adhesive paste is applied to the side face of each of honeycomb fired bodies to form an adhesive paste layer thereon so that the honeycomb fired bodies are then successively combined with one another, or a method in which the respective honeycomb fired bodies are temporarily secured into a molding frame having approximately the same shape as the shape of a ceramic block to be manufactured, and an adhesive paste is injected into gaps between the respective honeycomb fired bodies.

The material forming the adhesive paste is not particularly limited, and examples thereof include an inorganic binder, an organic binder, inorganic fibers, inorganic particles, and a combination of these materials.

Examples of the inorganic binder include silica sol, alumina sol, and the like. Each of these materials may be used alone, or two or more kinds of these may be used in combination. Silica sol is desirable among the inorganic binders.

Examples of the organic binder include polyvinyl alcohol, methyl cellulose, ethyl cellulose, carboxymethyl cellulose, and the like. Each of these may be used alone or two or more kinds of these may be used in combination. Carboxymethyl cellulose is desirable among the organic binders.

Examples of the inorganic fibers include ceramic fibers and the like made from silica-alumina, mullite, alumina, silica, or the like. Each of these may be used alone or two or more kinds of these may be used in combination. Silica-alumina fibers are desirable among the ceramic fibers.

Examples of the inorganic particles include carbides, nitrides, and the like, and specific examples thereof include inorganic powder or whisker and the like made from silicon carbide, silicon nitride, boron nitride and the like. Each of these may be used alone, or two or more kinds of these may be used in combination. Out of the inorganic particles, silicon carbide is desirably used due to its superior thermal conductivity.

Next, this aggregated body of the honeycomb fired bodies is heated so that the adhesive paste layers are dried and solidified to form adhesive layers so that a round pillar-shaped ceramic block is manufactured to complete the honeycomb fired body combining process.

The ceramic block may undergo a cutting process and a grinding process, on demand.

Subsequently, if necessary, a coating process is carried out on the periphery of a ceramic block by using a sealing material paste to form a sealing material layer thereon so that a honeycomb structure in which a ceramic block having a round pillar shape, formed by bonding a plurality of honeycomb fired bodies to one another by interposing an adhesive layer, with a sealing material layer being formed on the peripheral portion thereof, can be manufactured.

Here, as the material forming the sealing material paste, the same material as the adhesive paste that has been described can be used preferably.

Here, the coating process is not necessarily needed, and may be carried out on demand. In the case where the coating process is not carried out, the manufacturing processes of a honeycomb structure according to the method for manufacturing a honeycomb structure according to the first aspect of the present invention can be completed at the time when the ceramic block has been manufactured.

A method for forming the sealing material paste is not particularly limited, and it is desirable to use a method in which the sealing material paste is adhered thereto in such a manner so as to cover the protruding portion so that a sealing material layer having a thickness thicker than the height of the protruding portion can be formed.

Thereafter, if necessary, a catalyst may be supported on the honeycomb structure. Here, the catalyst may be supported on each of the honeycomb fired bodies prior to manufacturing the honeycomb aggregated body.

In the method for manufacturing a honeycomb structure according to the embodiment of the first aspect of the present invention that has been discussed above, the subject relating to the coupling-portion cutting process is a coupled honeycomb fired body after fired. The subject is not limited to the coupled honeycomb fired body after the firing process, and may be a coupled body that is a molded body prior to the firing process and includes two or more pieces of honeycomb molded bodies, that is, a coupled honeycomb molded body.

In other words, the method for manufacturing a honeycomb structure according to the embodiment of the second aspect of the present invention is a method for manufacturing a honeycomb structure comprising the steps of: extrusion-molding a raw material composition containing ceramic powder and a binder to manufacture a coupled honeycomb molded body having a shape in which a plurality of pillar-shaped honeycomb molded bodies, each having a large number of cells disposed in parallel with one another in a longitudinal direction with a cell wall therebetween, are integrated with one another by interposing a coupling portion; cutting the coupling portion of the coupled honeycomb molded body to manufacture a plurality of coupling-portion-cut honeycomb molded bodies; firing the coupling-portion-cut honeycomb molded bodies to manufacture coupling-portion-cut honeycomb fired bodies; and binding a plurality of honeycomb fired bodies by interposing an adhesive layer, at least one of the plurality of honeycomb fired bodies being a coupling-portion-cut honeycomb fired body.

According to the method for manufacturing a honeycomb structure according to the embodiment of the second aspect of the present invention, at least one of the honeycomb fired bodies to be combined in a combining step of honeycomb fired bodies was manufactured by integrating manufacturing a coupled honeycomb molded body having a shape in which a plurality of honeycomb molded bodies are integrated with one another by interposing a coupling portion, manufacturing coupling-portion-cut honeycomb molded bodies by cutting the coupling portions, and then firing the coupling-portion-cut honeycomb molded bodies.

According to the method, it is possible to manufacture, from a single coupled honeycomb molded body, a plurality of coupling-portion-cut honeycomb molded bodies having approximately the same length in the longitudinal direction as the length of the coupled honeycomb molded body in the longitudinal direction, and a plurality of coupling-portion-cut honeycomb fired bodies can be manufactured by firing the coupling-portion-cut honeycomb molded bodies.

Therefore, it is possible to increase the number of honeycomb fired bodies that can be manufactured per unit time.

In the method for manufacturing a honeycomb structure according to the embodiment of the second aspect of the present invention, an extrusion-molding process is carried out by using the same apparatuses and methods as those described in the method for manufacturing a honeycomb structure according to the first aspect of the present invention, and then a molded-body cutting process is carried out for cutting the extrusion-molded body in a direction perpendicular to the longitudinal direction thereof on the extrusion-molded body, so that a molded body having a shape in which two or more pieces of honeycomb molded bodies are integrated with one another by interposing a coupling portion, that is, a coupled honeycomb molded body, is manufactured.

Moreover, by cutting the coupling portion of this coupled honeycomb molded body, two or more pieces of coupling-portion-cut honeycomb molded bodies are manufactured.

According to the method for manufacturing a honeycomb structure according to the embodiment of the second aspect of the present invention, two or more pieces of coupling-portion-cut honeycomb molded bodies can be manufactured from a single coupled honeycomb molded body, and two or more pieces of coupling-portion-cut honeycomb fired bodies can be manufactured by carrying out a drying process, a plugging process, a degreasing process and a firing process on the coupling-portion-cut honeycomb molded bodies.

Here, the drying process and the plugging process are not necessarily needed, and may be carried out on demand.

By using at least one of the coupling-portion-cut honeycomb molded bodies manufactured through the processes, the same treatment processes as those of the method for manufacturing a honeycomb structure according to the first aspect of the present invention are carried out so that a honeycomb structure can be manufactured.

According to the method for manufacturing a honeycomb structure according to the embodiment of the second aspect of the present invention, it is possible to manufacture two or more pieces of coupling-portion-cut honeycomb molded bodies having approximately the same length in the longitudinal direction as the length of the coupled honeycomb molded body in the longitudinal direction, from one coupled honeycomb molded body, and two or more pieces of honeycomb fired bodies can be manufactured by carrying out a firing process on the honeycomb molded bodies manufactured through the processes.

Therefore, it is possible to increase the number of honeycomb fired bodies that can be manufactured per unit time.

Moreover, according to a manufacturing process for a honeycomb fired body in the method for manufacturing a honeycomb structure according to the embodiment of the second aspect of the present invention, it is possible to manufacture two or more pieces of coupling-portion-cut honeycomb fired bodies by manufacturing a single coupled honeycomb molded body having a predetermined length.

Therefore, in comparison with the case where a honeycomb molded body having approximately the same shape as the shape of the honeycomb fired body to be manufactured is formed through an extrusion-molding process and a molded body cutting process and the resulting honeycomb molded body then undergoes treatments in the respective processes to manufacture a honeycomb fired body having a predetermined length, it is possible to increase the number of the honeycomb fired bodies that can be manufactured by the time when a single die has been worn out.

Therefore, the frequency of exchanging dies is reduced, and it becomes easy to reduce the cost and time-consuming tasks needed for exchanging the dies. Consequently, it becomes easy to reduce costs needed for manufacturing a honeycomb structure.

The method for cutting the molded body into a predetermined length is not particularly limited, however, for example, a cutter with a blade, a laser, or a linear shape member may be used for carrying out the cutting method. The method in which the linear shape member is used for cutting is desirably employed among these methods. In the case where the linear shape member is used, this does not tend to cause deformation of the cut portion, such as shear deformation, and cracks, and it becomes easy to reduce the running cost to a low level.

In this case, the cutting process is desirably carried out so as to allow a protruding portion to remain on the cut portion.

The linear shape member to be used for the cutting process is not particularly limited, and examples thereof include a metal wire, a resin line and a metal wire coated with resin, and the like. The metal wire is preferably used from the viewpoint of durability and the like while resin is preferably used from the viewpoint of non-adhesive property. Therefore, the metal wire, such as SUS, coated with resin on the periphery thereof, is preferably used from these viewpoints.

Moreover, in the method for manufacturing a honeycomb structure according to the embodiment of the second aspect of the present invention, the timing at which the coupling portion of the coupled honeycomb molded body is cut is not particularly limited as long as it is after the extrusion molding process and before the firing process.

In this case, since the number of molded bodies to be processed before the processes prior to the coupling-portion cutting process can be reduced, it is possible to increase the number of honeycomb fired bodies to be manufactured per unit time.

In the case of cutting the coupling portion immediately after the extrusion molding process, since the hardness of the coupling portion of the coupled honeycomb molded body is low and since the coupling portion can be cut more easily, this process is preferably used.

Moreover, in the case of cutting the coupling portion of the coupled honeycomb molded body after having undergone the drying process and the degreasing process, since the shape of the coupled honeycomb molded body is more stable in comparison with the coupled honeycomb molded body immediately after the extrusion-molding process and since the handling of the coupled honeycomb molded body is easier, this process is preferably used.

Moreover, since the coupled honeycomb molded body and the coupling-portion-cut honeycomb molded body prior to the firing process are comparatively unstable in the shapes thereof, which makes them different from the honeycomb fired body, it is preferable to carry out the respective treatment processes while the coupled honeycomb molded body and the coupling-portion-cut honeycomb molded body are disposed on a mounting base or the like so as to prevent the shapes from collapsing.

Furthermore, in the method for manufacturing a honeycomb structure according to the embodiment of the second aspect of the present invention, the coupled honeycomb molded body desirably has a shape in which two pieces of the pillar-shaped honeycomb molded bodies, each having a side face formed by two planes and a single curved face, are integrated with each other by interposing a coupling portion, the coupling portion being formed on a side face formed by the single curved face and having an approximately rectangular parallelepiped shape with longer sides approximately in parallel with the longitudinal direction.

In addition, the method for manufacturing a honeycomb structure according to the embodiment of the second aspect of the present invention is desirably a method for manufacturing a honeycomb structure, further comprising: a coating step of forming a sealing material layer (coat layer) on a periphery of a ceramic block, wherein in the coupling-portion-cutting step, the coupling portion is cut approximately in parallel with the longitudinal direction in such a manner so as to allow a piece of the coupling portion to remain on the side face formed by the curved face of the honeycomb molded body to manufacture a coupling-portion-cut honeycomb molded body having a protruding portion thereon; and in the combining step, the fired bodies are combined with one another so as to allow the side face formed by the curved face of the coupling-portion-cut honeycomb fired body having a protruding portion formed to be disposed on an outermost periphery to manufacture the ceramic block.

In addition, in the method for manufacturing a honeycomb structure according to the embodiment of the second aspect of the present invention, desirably, the protruding portion has an approximately rectangular parallelepiped shape with longer sides approximately in parallel with the longitudinal direction, and a width and a height of an approximately rectangular shape formed by cutting the protruding portion perpendicularly to the longitudinal direction are both about 0.5 to about 2 mm.

In addition, the method for manufacturing a honeycomb structure according to the embodiment of the second aspect of the present invention is desirably a method for manufacturing a honeycomb structure, further comprising: a plugging step of plugging either one of the ends of each of the cells.

The description has so far discussed methods for manufacturing a honeycomb structure according to the embodiments of the first and second aspects of the present invention by exemplifying a honeycomb structure that is mainly used as a ceramic filter preferably. In the methods for manufacturing a honeycomb structure according to the embodiments of the first and second aspects of the present invention, a honeycomb structure may be manufactured without injecting a plug material paste therein, and the honeycomb structure according to the embodiment in which the ends of cells are not plugged by plugs can be preferably used as a catalyst supporting carrier, and the same effects as the effects of the first and second aspects of the present invention can be obtained in the same manner as in the application thereof as a ceramic filter.

EXAMPLES

The following description will discuss the present invention in more detail by means of Examples; however, the present invention is not intended to be limited only by these Examples.

Example 1

Manufacture of A-Type Coupling Portion Cut Honeycomb Fired Body

First, 52.2% by weight of coarse powder of silicon carbide having an average particle size of 22 µm and 22.4% by weight of fine powder of silicon carbide having an average particle size of 0.5 µm were wet-mixed. Then, with respect to the resulting mixture were added and kneaded 4.8% by weight of acrylic resin, 2.6% by weight of an organic binder (methylcellulose), 2.9% by weight of a lubricant (UNILUB, made by NOF Corp.), 1.3% by weight of glycerin and 13.8% by weight of water to prepare a raw material composition.

This raw material composition was further kneaded, and then underwent an extrusion-molding process so that a raw coupled honeycomb molded body having approximately the same cross-sectional shape as the cross-sectional shape shown in FIG. 4 was manufactured.

At this time, the extrusion-molding velocity was set to 4000 mm/min, and a die made of a hard metal (WC) was used as a die to be attached to the tip of the extrusion-molding machine.

As shown in FIG. 4, these raw molded bodies were placed on mounting surfaces 329 of a mounting base 327 having a V-shape in its cross sectional shape of molded body mounting surfaces, with side faces of the raw coupled honeycomb molded bodies being made in contact with the V-shape.

Moreover, the raw coupled honeycomb molded bodies underwent a molded body cutting process to be cut in a direction perpendicular to the longitudinal direction into a length of 150 mm.

Next, the raw coupled honeycomb molded body that had been cut was dried by using a microwave drying apparatus so that a dried body of the coupled honeycomb molded body was formed, and a plugging process was carried out in which predetermined cells were filled with a paste having the same composition as the composition of the raw coupling molded body, and this was again dried by using a drying apparatus.

The dried molded body was degreased at 400° C., and fired at 2200° C. in a normal-pressure argon atmosphere for 3 hours so that a coupled honeycomb fired body was manufactured.

Then, the two coupling portions formed in the coupled honeycomb fired body were cut and broken by a coupling member cutting process so that two pieces of coupling-portion-cut honeycomb fired bodies were manufactured.

The honeycomb fired body thus manufactured was an A-type coupling-portion-cut honeycomb fired body with a protruding portion being formed at one portion of a side face formed by a curved face, and its length in the longitudinal direction was 150 mm.

Here, the protruding portion has an approximately rectangular parallelepiped shape having longer sides in parallel with the longitudinal direction of the honeycomb fired body, and as determined by dimensions shown in FIG. 6B, the width W of the protruding portion was 0.5 mm, and the height H was 0.5 mm.

(Manufacture of B-Type, C-Type Honeycomb Fired Bodies)

Extrusion-molding processes were carried out by using the mixed composition so that honeycomb molded bodies respectively having the same shapes as B-type honeycomb fired bodies 230 and the C-type honeycomb fired bodies 240 were formed. Then, the B-type honeycomb fired bodies and the C-type honeycomb fired bodies were manufactured by carrying out the same drying process, plugging process, degreasing process and firing process as those of the manufacturing processes of the A-type coupling-portion-cut honeycomb fired body.

Here, as the extrusion-molding machine used for manufacturing the respective honeycomb fired bodies, mutually different machines were used, and each of the dies attached to the respective extrusion-molding machines was continuously used without being exchanged until it was no longer able to manufacture a molded body having a predetermined thickness.

(Manufacture of Ceramic Block)

Next, by using a heat-resistant adhesive paste containing 30% by weight of alumina fibers having an average fiber length of 20 µm, 21% by weight of silicon carbide particles having an average particle size of 0.6 µm, 15% by weight of silica sol, 5.6% by weight of carboxy methylcellulose and 28.4% by weight of water, four pieces of A-type coupling-portion-cut honeycomb fired bodies, eight pieces of B-type honeycomb fired bodies and four pieces of C-type honeycomb fired bodies were bonded to one another, and further dried at 120° C. so that a ceramic block in a round pillar shape having an adhesive layer of 1 mm in thickness, having protruding portions at four positions on the peripheral face, was manufactured.

(Formation of Sealing Material Layer)

Next, by using the same sealing material paste as the adhesive paste, a coating step of forming a sealing material paste layer having a thickness of 2.5 mm on the peripheral face of the ceramic block was carried out. This sealing material paste layer was then dried at 120° C. so that a round pillar-shaped honeycomb structure having a size of 143.8 mm in diameter× 150 mm in length was manufactured.

Examples 2 and 3, Reference Examples 4 to 6

A honeycomb structure was manufactured in the same manner as in Example 1, the coupled honeycomb fired body was manufactured by varying the shape of the coupling portion so that the width W and the height H of the protruding portion formed on the A-type honeycomb fired body were set as shown in Table 1.

TABLE 1

| | Method for manufacturing A-type honeycomb fired body | | Size of protruding portion | Number of manufactured A-type fired bodies | Number of A-type fired bodies manufactured up | Separation of sealing material layer | | |
|---|---|---|---|---|---|---|---|---|
| | Shape of molded body | Cutting method | (W × H) (mm) | (pcs/unit time) | to wear of die (million pcs) | 200 times | 400 times | Note |
| Example 1 | Coupled honeycomb molded body | Bending and breaking | 0.5 × 0.5 | 1000 | 3.2 | + | + | |
| Example 2 | Coupled honeycomb molded body | Bending and breaking | 0.5 × 2.0 | 1000 | 3.2 | + | + | |
| Example 3 | Coupled honeycomb molded body | Bending and breaking | 2.0 × 0.5 | 1000 | 3.2 | + | + | |
| Reference Example 1 | Coupled honeycomb molded body | Jig-saw | 0.5 × 0.5 | 900 | 3.2 | + | + | |
| Reference Example 2 | Coupled honeycomb molded body | Jig-saw | NA | 900 | 3.2 | − | − | |
| Reference Example 3 | Coupled honeycomb molded body | Jig-saw | 3.0 × 0.5 | 900 | 3.2 | + | + | *1 |
| Reference Example 4 | Coupled honeycomb molded body | Bending and breaking | 0.5 × 3.0 | 1000 | 3.2 | + | + | *2 |
| Reference Example 5 | Coupled honeycomb molded body | Bending and breaking | 0.5 × 0.2 | 1000 | 3.2 | + | − | |
| Reference Example 6 | Coupled honeycomb molded body | Bending and breaking | 0.2 × 0.5 | 1000 | 3.2 | + | − | |
| Comparative Example 1 | Approximately the same shape as fired body | NA | NA | 500 | 1.6 | − | − | |

NA = Not Available
*1 Difficult in bending and breaking coupling portion
*2 With protruding portion protruding from sealing material layer Reference Example 1

An A-type coupling-portion-cut honeycomb fired body was manufactured in the same manner as in Example 1, except that instead of cutting the coupling portion of the coupled honeycomb fired body by bending and breaking the coupling portion thereof, the coupling portion was cut off by using a jig-saw in a direction parallel to the longitudinal direction of the coupled honeycomb fired body. Except for this point, a honeycomb structure was manufactured in the same manner as in Example 1 by using this A-type coupling-portion-cut honeycomb fired body.

Reference Example 2

Upon cutting off the coupling portion by using a jig-saw, the coupling portion was cut off along the side face formed by the curved face of the honeycomb fired body so that an A-type coupling-portion-cut honeycomb fired body was manufactured. The A-type coupling-portion-cut honeycomb fired body thus manufactured was an A-type coupling-portion-cut honeycomb fired body with no protruding portion being formed on the side face formed by the curved face. Except for this point, a honeycomb structure was manufactured in the same manner as in Example 1 by using the A-type coupling-portion-cut honeycomb fired body.

Reference Example 3

A coupled honeycomb fired body was manufactured by varying the shape of the coupling portion so that the width W and the height H of the protruding portion formed on the A-type coupling-portion-cut honeycomb fired body were set to 3.0 mm and 0.5 mm, respectively.

When an attempt was made to bend and break the coupling portion of the coupled honeycomb fired body to obtain an A-type coupling-portion-cut honeycomb fired body, the coupling portion was not bent and broken because the width of the coupling portion was too thick.

For this reason, the coupling portion was cut off by using a jig-saw in the same manner as in Reference Example 1, so that a coupling-portion-cut honeycomb fired body was manufactured.

Except for this point, a honeycomb structure was manufactured in the same manner as in Example 1 by using this A-type coupling-portion-cut honeycomb fired body.

Comparative Example 1

A honeycomb molded body having the same shape as the shape of the A-type honeycomb fired body 220, without a protruding portion formed thereon, was manufactured in the same manner as in Example 1 by undergoing the extrusion-molding process, except that the shape of the die to be attached to the extrusion-molding machine was replaced. Except for this point, a honeycomb structure was manufactured in the same manner as in Example 1 by using this A-type coupling-portion-cut honeycomb fired body.

(Measurements on the Number of A-Type Honeycomb Fired Bodies Manufactured by the Time when the Die has been Worn Out)

In the processes for manufacturing a honeycomb structure, the number of the A-type honeycomb fired bodies that were manufactured by the time when the die of the extrusion-molding machine used for manufacturing the A-type honeycomb fired bodies had been worn out was calculated.

The determination as to whether or not the die had been worn out was made by measuring the increase in the cell wall of the coupled honeycomb molded body or the honeycomb molded body for every extrusion-molding process for a predetermined period of time (100 hours). More specifically, when an increase of 5% in weight was observed in comparing the weight of the molded body with a preset value, it was determined that the die had been worn out.

When the presence of wear of the die was determined in this manner for every 100 hours of extrusion-molding processes, it was found in each of the Examples, Reference Examples and Comparative Examples that the die was worn out at the measurements after 1,000 hours of the extrusion-molding processes.

At this time, the number of coupled honeycomb molded bodies or honeycomb molded bodies that had been molded up to the wear of the die was 1,600,000 pcs in each of the Examples, Reference Examples and Comparative Examples.

In each of the Examples and Reference Examples, since two pieces of A-type honeycomb fired bodies were obtained from one coupled honeycomb molded body, the number of A-type honeycomb fired bodies that had been manufactured up to the wear of the die was 3,200,000 pcs.

In Comparative Example 1, since one A-type honeycomb fired body was manufactured from one honeycomb molded body, the number of A-type honeycomb fired bodies that had been manufactured up to the wear of the die was 1,600,000 pcs.

Table 1 shows the results of these.

(Measurements on the Number of A-Type Honeycomb Fired Bodies Manufactured Per Unit Time)

In each of the Examples, Reference Examples and Comparative Examples, the number of A-type honeycomb fired bodies manufactured per unit time was measured by using the same apparatus, and the measured values were compared with one another.

More specifically, the time in which the material was loaded into the extrusion-molding machine in Example 1 was determined as a point to measure from, and the period of time needed for completing 1,000 pcs of A-type honeycomb fired bodies by using one manufacturing line was measured, and this was defined as unit time.

Then, in the respective Examples, Reference Examples and Comparative Examples except for Example 1, the number of A-type honeycomb fired bodies manufactured per unit time was measured by using the same apparatus as Example 1.

Table 1 shows each of the numbers of A-type honeycomb fired bodies manufactured per unit time in the respective Examples, Reference Examples and Comparative Examples.

(Evaluation on Easiness of Separation of Sealing Material Layer)

Each of the honeycomb structures manufactured in the respective Examples, Reference Examples, and Comparative Examples was evaluated for the easiness of separation of the sealing material layer.

As an apparatus for evaluating the adhesive strength, an apparatus, configured by a 2 L common-rail-type diesel engine, exhaust-gas pipes that allow gases from the engine connected to the respective honeycomb filters to pass, and honeycomb filters having metal casings in which the respective honeycomb structures were housed, was used.

In this apparatus, the engine was driven at the number of revolutions of 2000 $min^{-1}$ and a torque of 47 Nm, and exhaust gases from the engine were allowed to flow through each of the honeycomb structures; thus, a regenerating treatment for the honeycomb structure was carried out by using a post-injection system for 10 minutes, for every driving operation corresponding to a travel distance of 500 km, and this was defined as one cycle.

After repeating this cycle 200 times and 400 times, the state of separation between the sealing material layer and the peripheral face of the ceramic block was visually observed. Table 1 shows the results thereof.

In Table 1, as a result of the visual observation, when a separation or a gap was observed between the sealing material layer and the peripheral face of the ceramic block, this state was denoted as "−" and when none of these defects were observed, this state was denoted as "+".

As clearly indicated in Table 1, in the method for manufacturing a honeycomb structure according to each of Examples and Reference Examples, about twice as many A-type honeycomb fired bodies per unit time was manufactured in comparison with the method for manufacturing a honeycomb structure according to Comparative Example 1. Thus, it was possible to manufacture the honeycomb structures more efficiently.

Moreover, in the method for manufacturing a honeycomb structure according to each of Examples and Reference Examples, the number of the A-type honeycomb fired bodies manufactured up to the wear of one die was twice as many as the number thereof manufactured by the method for manufacturing a honeycomb structure according to Comparative Example 1. Therefore, it was possible to reduce the frequency of exchanging dies, and consequently to cut costs for manufacturing the honeycomb fired bodies.

Moreover, in the case where a protruding portion was formed on the side face formed by the curved face of the honeycomb fired body as in a honeycomb structure manufactured by the method for manufacturing a honeycomb structure according to each of Examples and each of Reference Examples 1 and 3 to 6, no abnormalities such as peeling were observed between the sealing material layer and the peripheral face of the ceramic block after a 200-cycle repeat test; thus, the adhesive strength between the sealing material layer and the ceramic block was improved.

Moreover, in the case where the width and the height of the protruding portion were 0.5 mm or more as in a honeycomb structure manufactured by the method for manufacturing a honeycomb structure according to each of Examples 1 to 3 and Reference Examples 1, 3, and 4, defects such as a separation were not observed between the sealing material layer and the peripheral face of the ceramic block, even after the repeated tests of 400 times; thus, the results revealed that a high adhesive strength was observed between the sealing material layer and the ceramic block.

Furthermore, in a honeycomb structure manufactured by the method for manufacturing a honeycomb structure according to Reference Examples 4, since the height of the protruding portion installed in the honeycomb structure was 3.0 mm, the protruding portion stack out of the surface of the sealing material layer, and a mat disposed inside the metal casing was scraped off by the protruding portion upon installation into an exhaust gas purifying device, with the result that it was difficult to install the resulting honeycomb structure into the exhaust gas purifying device.

For this reason, it was necessary to thicken the sealing material layer.

Moreover, when the cutting process of the coupling portion is carried out by using a jig-saw as in the method for manufacturing a honeycomb structure according to each of Reference Examples 1 to 3, since more time is needed for cutting the coupling portion in comparison with the cutting process carried out by bending and breaking the coupling portion, the number of the A-type honeycomb fired bodies that can be manufactured per unit time was smaller in comparison with the method for manufacturing a honeycomb structure of Example 1.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for manufacturing a honeycomb structure, said method comprising:

extrusion-molding a raw material composition containing ceramic powder and a binder to manufacture a coupled honeycomb molded body having a shape in which a plurality of pillar-shaped honeycomb molded bodies are spaced apart from one another, each having a number of cells disposed in parallel with one another in a longitudinal direction with a cell wall therebetween, the pillar-shaped honeycomb molded bodies being integrated by interposing a coupling portion, the coupling portion being provided on a side face of each of said honeycomb molded bodies;

firing the coupled honeycomb molded body to manufacture a coupled honeycomb fired body;

cutting the coupling portion of the coupled honeycomb fired body to manufacture a plurality of coupling-portion-cut honeycomb fired bodies; and binding a plurality of honeycomb fired bodies by interposing an adhesive layer, at least one of the bound plurality of honeycomb fired bodies being a coupling-portion-cut honeycomb fired body, wherein the coupled honeycomb fired body has a shape in which two pieces of the pillar-shaped honeycomb fired bodies, each having a side face formed by at least two planes and a single curved face, are integrated with each other by interposing the coupling portion, the coupling portion being formed on a side face formed by the single curved face and having an approximately rectangular parallelepiped shape with longer sides approximately in parallel with the longitudinal direction.

2. The method for manufacturing a honeycomb structure according to claim 1, said method further comprising:

coating a sealing material layer on a periphery of a ceramic block formed of the bound plurality of honeycomb fired bodies, wherein the cutting of the coupling portion is performed such that the coupling portion is cut approximately in parallel with the longitudinal direction in such a manner so as to allow a piece of the coupling portion to remain on the side face formed by the curved face of the honeycomb fired body to manufacture a coupling-portion-cut honeycomb fired body having a protruding portion thereon, and wherein, during the coating of the sealing material layer, said the bound plurality of honeycomb fired bodies are combined with one another so as to allow the side face formed by the curved face of the coupling-portion-cut honeycomb fired body having the protruding portion thereon is disposed on an outermost periphery of the ceramic block.

3. The method for manufacturing a honeycomb structure according to claim 2, wherein the protruding portion has an approximately rectangular parallelepiped shape with longer sides approximately in parallel with the longitudinal direction, and the protruding portion has an approximately rectangular cross-sectional shape taken perpendicular to the longitudinal direction with a width and a height that are both about 0.5 to about 2 mm.

4. The method for manufacturing a honeycomb structure according to claim 3, wherein the sealing material layer is formed having a thickness that is larger than a thickness of the protruding portion.

5. The method for manufacturing a honeycomb structure according to claim 1, wherein the ceramic powder comprises silicon carbide or a silicon-containing silicon-carbide-based ceramic material containing about at least about 60% by weight of silicon carbide.

6. The method for manufacturing a honeycomb structure according to claim 1, said method further comprising plugging either one of the ends of each of the cells.

7. The method for manufacturing a honeycomb structure according to claim 1, said method further comprising placing the coupled honeycomb molded body that has been extrusion-molded onto a mounting surface of a mounting base having a V-shape in cross-section so that side faces of the coupled honeycomb molded body are in contact with the V-shape of the mounting surface on which the coupling portion and the plurality of pillar-shaped honeycomb molded bodies are bilaterally aligned.

8. The method for manufacturing a honeycomb structure according to claim 1, wherein the cutting of the coupling portion is performed using at least one of a diamond cutter, a jig-saw, a file, a cutter provided with a cutting blade, a laser, and a linear shape member.

9. The method for manufacturing a honeycomb structure according to claim 1, wherein the cutting of the coupling portion is performed by bending and breaking the coupling portion.

10. A method for manufacturing a honeycomb structure, said method comprising:

extrusion-molding a raw material composition containing ceramic powder and a binder to manufacture a coupled honeycomb molded body having a shape in which a plurality of pillar-shaped honeycomb molded bodies are spaced apart from one another, each having a number of cells disposed in parallel with one another in a longitudinal direction with a cell wall therebetween, the pillar-shaped honeycomb molded bodies being integrated by interposing a coupling portion, the coupling portion being provided on a side face of each of said honeycomb molded bodies;

cutting the coupling portion of the coupled honeycomb molded body to manufacture a plurality of coupling-portion-cut honeycomb molded bodies;

firing the coupling-portion-cut honeycomb molded bodies to manufacture coupling-portion-cut honeycomb fired bodies; and binding a plurality of honeycomb fired bodies by interposing an adhesive layer, at least one of the bound plurality of honeycomb fired bodies being a coupling-portion-cut honeycomb fired body, wherein the coupled honeycomb molded body has a shape in which two pieces of the pillar-shaped honeycomb molded bodies, each having a side face formed by at least two planes and a single curved face, are integrated with each other by interposing the coupling portion, the coupling portion being formed on a side face formed by the single curved face and having an approximately rectangular parallelepiped shape with longer sides approximately in parallel with the longitudinal direction.

11. A method for manufacturing a honeycomb structure, said method comprising:
   extrusion-molding a raw material composition containing ceramic powder and a binder to manufacture a coupled honeycomb molded body having a shape in which a plurality of pillar-shaped honeycomb molded bodies are spaced apart from one another, each having a number of cells disposed in parallel with one another in a longitudinal direction with a cell wall therebetween, the pillar-shaped honeycomb molded bodies being integrated by interposing a coupling portion, the coupling portion being provided on a side face of each of said honeycomb molded bodies;
   cutting the coupling portion of the coupled honeycomb molded body to manufacture a plurality of coupling-portion-cut honeycomb molded bodies;
   firing the coupling-portion-cut honeycomb molded bodies to manufacture coupling-portion-cut honeycomb fired bodies;
   binding a plurality of honeycomb fired bodies by interposing an adhesive layer, at least one of the bound plurality of honeycomb fired bodies being a coupling-portion-cut honeycomb fired body; and
   coating a sealing material layer on a periphery of a ceramic block formed of the bound plurality of honeycomb fired bodies,
   wherein the cutting of the coupling portion is performed such that the coupling portion is cut approximately in parallel with the longitudinal direction in such a manner so as to allow a piece of the coupling portion to remain on the side face formed by a curved face of the honeycomb molded body to manufacture a coupling-portion-cut honeycomb molded body having a protruding portion thereon, and
   wherein, during the coating of the sealing material layer, said the bound plurality of honeycomb fired bodies are combined with one another so as to allow the side face formed by the curved face of the coupling-portion-cut honeycomb fired body having the protruding portion thereon is disposed on an outermost periphery of the ceramic block.

12. The method for manufacturing a honeycomb structure according to claim 10 or 11, wherein the ceramic powder comprises silicon carbide or a silicon-containing silicon-carbide-based ceramic material containing about at least about 60% by weight of silicon carbide.

13. The method for manufacturing a honeycomb structure according to claim 10 or 11, said method further comprising plugging either one of the ends of each of the cells.

14. The method for manufacturing a honeycomb structure according to claim 10 or 11, said method further comprising placing the coupled honeycomb molded body that has been extrusion-molded onto a mounting surface of a mounting base having a V-shape in cross-section so that side faces of the coupled honeycomb molded body are in contact with the V-shape of the mounting surface on which the coupling portion and the plurality of pillar-shaped honeycomb molded bodies are bilaterally aligned.

15. The method for manufacturing a honeycomb structure according to claim 10 or 11, wherein the cutting of the coupling portion is performed using at least one of a diamond cutter, a jig-saw, a file, a cutter provided with a cutting blade, a laser, and a linear shape member.

16. The method for manufacturing a honeycomb structure according to claim 10 or 11, wherein the cutting of the coupling portion is conducted after one of a drying process and a degreasing process.

17. The method for manufacturing a honeycomb structure according to claim 11, wherein the protruding portion has an approximately rectangular parallelepiped shape with longer sides approximately in parallel with the longitudinal direction, and the protruding portion has an approximately rectangular cross-sectional shape taken perpendicular to the longitudinal direction with a width and a height that are both about 0.5 to about 2 mm.

18. The method for manufacturing a honeycomb structure according to claim 17, wherein the sealing material layer is formed having thickness that is larger than a thickness of the protruding portion.

19. An extrusion-molding method for forming a coupled honeycomb molded body, said method comprising:
   extrusion-molding a raw material composition containing ceramic powder and a binder through a die installed in an extrusion-molding machine to form the coupled honeycomb molded body having a shape in which a plurality of pillar-shaped honeycomb molded bodies spaced apart from one another, each having a number of cells disposed in parallel with one another in a longitudinal direction with a cell wall therebetween, the pillar-shaped honeycomb molded bodies being integrated by interposing a coupling portion, the coupling portion being provided on a side face of each of said honeycomb molded bodies, wherein:
   the coupled honeycomb molded body further comprises a shape-holding unit adjacent to the plurality of pillar-shaped honeycomb molded bodies;
   the die comprises a die main body integrally formed of a material supply unit and a molding groove portion, and an outer frame that supports and secures the die main body;
   the material supply unit includes a material supply hole that allows a wet mixture of the raw material to pass therethrough;
   the molding groove portion includes a molding groove for forming the wet mixture supplied through the material supply hole into a predetermined shape of the cell wall, the molding groove being defined by a number of square pillar-shaped members and a wall portion; and
   the number of square pillar-shaped members form the cells in the coupled honeycomb molded body, and the wall portion separates each of the plurality of pillar-shaped honeycomb molded bodies from the shape-holding unit, but leaves the coupling portion therebetween, the number of square pillar-shaped members and the wall portion being arranged in a state where the number of square pillar-shaped members and the wall portion are supported on the material supply unit.

20. The extrusion-molding method for forming a coupled honeycomb molded body according to claim 19, wherein the extrusion-molding process is conducted in a manner that allows the wet mixture to continuously pass through the molding groove defined by the number of pillar-shaped members and the wall portion and to form the coupled honeycomb molded body having at least two of the pillar-shaped honeycomb molded bodies that are integrated with one another by interposing the coupling portion.

* * * * *